US011501487B2

United States Patent
Park et al.

(10) Patent No.: US 11,501,487 B2
(45) Date of Patent: Nov. 15, 2022

(54) ELECTRONIC DEVICE AND CONTROL METHOD THEREOF

(71) Applicant: Samsung Electronics Co., Ltd., Suwon-si (KR)

(72) Inventors: Youngjin Park, Suwon-si (KR); Hyoyoung Kim, Suwon-si (KR); Seonghun Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/293,715

(22) PCT Filed: Oct. 23, 2019

(86) PCT No.: PCT/KR2019/013963
§ 371 (c)(1),
(2) Date: May 13, 2021

(87) PCT Pub. No.: WO2020/105871
PCT Pub. Date: May 28, 2020

(65) Prior Publication Data
US 2022/0012940 A1    Jan. 13, 2022

(30) Foreign Application Priority Data
Nov. 22, 2018 (KR) .................. 10-2018-0145777

(51) Int. Cl.
G06T 15/00    (2011.01)
G06T 15/20    (2011.01)
(Continued)

(52) U.S. Cl.
CPC ............. *G06T 15/205* (2013.01); *G06T 7/70* (2017.01); *G06T 19/20* (2013.01);
(Continued)

(58) Field of Classification Search
CPC ............................. G06T 15/205; G06T 19/20
See application file for complete search history.

(56) References Cited

U.S. PATENT DOCUMENTS 8,847,880 B2    9/2014 Lu et al.
8,866,845 B2    10/2014 Leung et al.
(Continued)

FOREIGN PATENT DOCUMENTS

JP    2013-513191 A    4/2013
JP    5210401 B2    6/2013
(Continued)

OTHER PUBLICATIONS

Hu et al., Avatar Digitization From a Single Image for Real-Time Rendering, ACM Transactions on Graphics, vol. 36, No. 6, Article 195, Nov. 2017 (Year: 2017).*
(Continued)

*Primary Examiner* — Charles Tseng
(74) *Attorney, Agent, or Firm* — Jefferson IP Law, LLP

(57) ABSTRACT

An electronic device is disclosed. The present electronic device includes a display, a processor electronically connected to the display so as to control the display, and a memory electronically connected to the processor. The memory stores instructions causing the processor to control the display to display a 3D modeling image acquired by applying an input 2D image to a learning network model configured to convert the input 2D image into a 3D modeling image, and the learning network model is obtained by learning using a 3D pose acquired by rending virtual 3D modeling data and a 2D image corresponding to the 3D pose.

6 Claims, 18 Drawing Sheets

(51) Int. Cl.
   *G06T 7/70* (2017.01)
   *G06T 19/20* (2011.01)
(52) U.S. Cl.
   CPC .............. *G06T 2200/24* (2013.01);
     *G06T 2207/20081* (2013.01); *G06T 2207/20084* (2013.01); *G06T 2207/30196* (2013.01); *G06T 2219/2004* (2013.01)

(56) References Cited

U.S. PATENT DOCUMENTS

| | | |
|---|---|---|
| 8,958,600 B2 | 2/2015 | Othmezouri et al. |
| 9,165,190 B2 | 10/2015 | Zhang et al. |
| 9,418,467 B2 | 8/2016 | Heisele |
| 9,971,960 B2 | 5/2018 | Mo |
| 2014/0300612 A1* | 10/2014 | Li .................. A63F 13/79 345/473 |
| 2016/0292779 A1* | 10/2016 | Rose .................. G06F 30/20 |
| 2017/0161590 A1 | 6/2017 | Boulkenafed et al. |
| 2018/0181802 A1* | 6/2018 | Chen .................. G06V 10/454 |
| 2018/0189974 A1 | 7/2018 | Clark et al. |

FOREIGN PATENT DOCUMENTS

| | | |
|---|---|---|
| JP | 2014-123366 A | 7/2014 |
| KR | 10-1014852 B1 | 2/2011 |
| KR | 10-2012-0007878 A | 1/2012 |
| KR | 10-1410273 B1 | 6/2014 |
| KR | 10-1665039 B1 | 10/2016 |

OTHER PUBLICATIONS

Li et al., 3D Human Pose Estimation from Monocular Images with Deep Convolutional Neural Network, Asian Conference on Computer Vision, 2014 (Year: 2014).*
Extended European Search Report dated Aug. 31, 2021, issued in European Patent Application No. 19888145.0.
Korean Office Action dated Jan. 22, 2020, issued in Korean Patent Application No. 10-2018-0145777.
Korean Office Action dated Mar. 25, 2020, issued in Korean Patent Application No. 10-2018-0145777.
International Search Report and Written Opinion dated Feb. 20, 2020, issued in International Patent Application No. PCT/KR2019/013963.

* cited by examiner

<AN ACTUAL HUMAN MODEL TAKES A POSE 1 DIRECTLY AND
IT IS PHOTOGRAPHED BY A PLURALITY OF CAMERAS>

<ACQUIRE EACH 2D IMAGE PHOTOGRAPHED BY A PLURALITY OF CAMERAS>

<GENERATE A 3D CHARACTER>

<3D CHARACTER CAPTURE METHOD>

| CATEGORY | POSE | IMAGE |
|---|---|---|
| BASIC POSTURE | Pose 1 | |
| BASIC POSTURE | Pose 2 | |
| BASIC POSTURE | Pose 3 | |
| BASIC POSTURE | Pose 4 | |

→

<pose 1>   <pose 2>   <pose 3>   <pose 4>

FIG. 10

| CATEGORY | POSE | IMAGE |
|---|---|---|
| YOGA POSTURE | Pose 1 | |
| YOGA POSTURE | Pose 2 | |
| YOGA POSTURE | Pose 3 | |
| YOGA POSTURE | Pose 4 | |

→ LEARNING DATA ACQUISITION PART

<DISPLAY JOINTS OF A 3D CHARACTER>

<MOVABLE RANGES OF BODY PARTS
USING JOINTS OF A 3D CHARACTER>

ELECTRONIC DEVICE AND CONTROL METHOD THEREOF

TECHNICAL FIELD

The disclosure relates to an electronic device and a control method thereof, and more particularly, to an electronic device that recognizes an action of an object included in image input data, and a control method thereof.

DESCRIPTION OF THE RELATED ART

For receiving image data and recognizing an action of an object included in the image data, an artificial intelligence learning network model may be used. Here, a trained model may determine what kind of action an object included in an input image is taking. In particular, for determining what kind of action an object is taking, a complex calculation process is required.

Also, for providing a correct recognition result, an artificial intelligence model should use a large amount of learning data. In general, a motion capture method of photographing an object directly with a camera for generating learning data may be used. However, in a motion capture method, there may be inconvenience of having to photograph an object directly. For example, an object may be an object that is too big to photograph with a camera, or an object that is difficult to obtain.

Accordingly, a motion capture method has problems that it may have a physical limitation for generating a large amount of learning data, and the cost may be high.

DETAILED DESCRIPTION OF THE INVENTION

Technical Problem

The disclosure was devised for improving the aforementioned problems, and the purpose of the disclosure is in providing an electronic device that generates a learning network model for pose identification by using a 3D human model, and a control method thereof.

Technical Solution

An electronic device according to an embodiment of the disclosure for achieving the aforementioned purpose includes a display, a processor electronically connected to the display so as to control the display, and a memory electronically connected to the processor, wherein the memory stores instructions causing the processor to control the display to display a 3D modeling image acquired by applying an input 2D image to a learning network model configured to convert the input 2D image into a 3D modeling image, and the learning network model is a learning network model trained by using a 3D pose acquired by rending virtual 3D modeling data and a 2D image corresponding to the 3D pose.

Here, the learning network model may be a learning network model that may transform a 3D human model into a plurality of 3D poses based on data and acquire at least one 2D image corresponding to each of the plurality of 3D poses, and that is trained using the plurality of 3D poses and the at least one 2D image corresponding to each of the plurality of 3D poses.

Also, the learning network model may identify profile information of an object included in the input 2D image, and acquire the 3D human model corresponding to the profile information.

In addition, the learning network model may transform the pose of the 3D human model such that a plurality of body parts, divided based on joints included in the 3D human, model move within a predetermined angle range based on the 3D modeling data, and acquire at least one 2D image corresponding to the transformed pose.

Further, the learning network model may transform a 3D human model into the 3D pose based on the 3D modeling data, and acquire a plurality of 2D images corresponding to different directions with respect to the 3D pose.

Meanwhile, the 3D modeling data may include at least one of angle data among a plurality of body parts divided based on joins included in a 3D human model, length data of each body part, or direction data of each body part.

Also, the learning network model may learn weights of a neural network included in the learning network model by using a plurality of 3D poses and at least one 2D image corresponding to each of the plurality of 3D poses.

Meanwhile, the processor may, based on a user instruction for changing a user viewpoint being input, input information corresponding to the user instruction into the learning network model, and the learning network model may output the 3D modeling image based on the information corresponding to the user instruction.

Here, the user viewpoint may include at least one of a direction which a user is toward or a distance which the user is toward.

Also, the processor may provide a UI for receiving input of pose information for transforming a 3D human model.

A control method of an electronic device according to an embodiment of the disclosure includes the steps of receiving input of a 2D image, and displaying a 3D modeling image acquired by applying the input 2D image to a learning network model configured to convert the 2D image into a 3D modeling image, wherein the learning network model is a learning network model trained by using a 3D pose acquired by rending virtual 3D modeling data and a 2D image corresponding to the 3D pose.

Here, the learning network model may be a learning network model that may transform a 3D human model into a plurality of 3D poses based on data and acquire at least one 2D image corresponding to each of the plurality of 3D poses, and that is trained using the plurality of 3D poses and the at least one 2D image corresponding to each of the plurality of 3D poses.

Also, the learning network model may identify profile information of an object included in the input 2D image, and acquire the 3D human model corresponding to the profile information.

In addition, the learning network model may transform the pose of the 3D human model such that a plurality of body parts, divided based on joints included in the 3D human, model move within a predetermined angle range based on the 3D modeling data, and acquire at least one 2D image corresponding to the transformed pose.

Further, the learning network model may transform a 3D human model into the 3D pose based on the 3D modeling data, and acquire a plurality of 2D images corresponding to different directions with respect to the 3D pose.

Also, the 3D modeling data may include at least one of angle data among a plurality of body parts divided based on joins included in a 3D human model, length data of each body part, or direction data of each body part.

In addition, the learning network model may learn weights of a neural network included in the learning network model by using a plurality of 3D poses and at least one 2D image corresponding to each of the plurality of 3D poses.

Also, the control method of an electronic device may further include the step of, based on a user instruction for changing a user viewpoint being input, inputting information corresponding to the user instruction into the learning network model, and the learning network model may output the 3D modeling image based on the information corresponding to the user instruction.

Here, the user viewpoint may include at least one of a direction which a user is toward or a distance which the user is toward.

Also, the control method of an electronic device may provide a UI for receiving input of pose information for transforming a 3D human model.

BRIEF DESCRIPTION OF DRAWINGS

FIG. 10 is a diagram for illustrating an operation of acquiring learning data based on the 2D image acquired by FIG. 9;

MODE FOR IMPLEMENTING THE INVENTION

Figure 1:
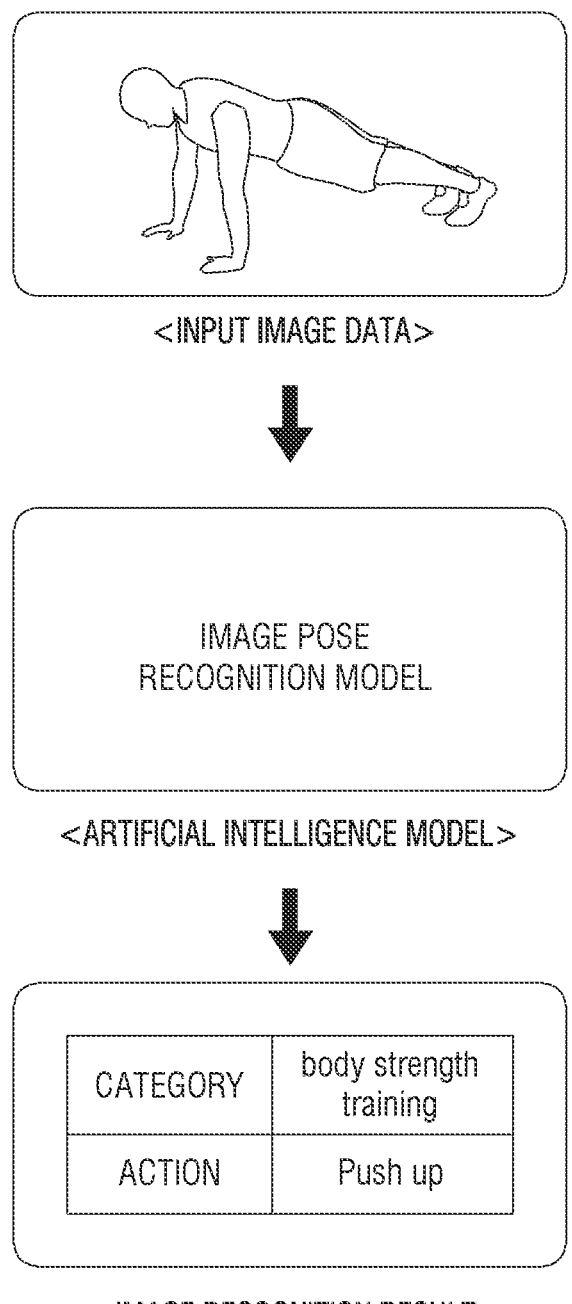
FIG. 1 is a diagram for illustrating a process of recognizing an action of an object included in an image.

Before describing the disclosure in detail, the description format of this specification and the drawings will be described.

First, as terms used in this specification and the claims, general terms were selected in consideration of the functions in the various embodiments of the disclosure. However, the terms may vary depending on the intention of those skilled in the art, legal or technical interpretation, or emergence of new technologies. Also, there are some terms that were arbitrarily designated by the applicant, and in such cases, the meaning of the terms may be interpreted as defined in this specification. In case there is no specific definition of the terms, the meaning of the terms may be interpreted based on the overall content of this specification and common technical knowledge in the pertinent technical field.

Also, the same reference numerals or symbols described in each drawing accompanying this specification refer to components or elements performing substantially the same functions. For the convenience of explanation and understanding, the components or elements will be described by using the same reference numerals or symbols in different embodiments. That is, even if all elements having the same reference numerals are illustrated in a plurality of drawings, the plurality of drawings do not mean one embodiment.

In addition, in this specification and the claims, terms including ordinal numbers such as "the first," "the second," etc. may be used for distinguishing elements. These ordinal numbers are used to distinguish the same or similar elements from one another, and the meaning of the terms are not to be interpreted in a restrictive way due to use of such ordinal numbers. The terms are used only for the purpose of distinguishing one element from another element. As an example, the orders of usage or the orders of arrangement, etc. of elements combined with such ordinal numbers are not to be restricted by the numbers. Also, depending on needs, each ordinal number may be interchangeably used.

Further, in this specification, singular expressions include plural expressions, unless defined obviously differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

Also, in the embodiments of the disclosure, terms such as "a module," "a unit," and "a part" are for referring to elements performing at least one function or operation, and these elements may be implemented as hardware or software, or as a combination of hardware and software. Further, a plurality of "modules," "units," and "parts" may be integrated into at least one module or chip and implemented as at least one processor, except when each of them needs to be implemented as independent specific hardware.

In addition, in the embodiments of the disclosure, the description that a part is connected with another part includes not only a case of direct connection, but also a case of indirect connection through another medium. Also, the description that a part includes an element means that another element may be further included, but not that another element is excluded, unless there is a particular opposing description.

Calculations in the disclosure may be performed by a recognition system based on machine learning, and in the disclosure, a recognition system based on deep learning which is a classification system by a series of machine learning algorithms based on a neural network will be described as an example.

A recognition system based on deep learning may include at least one classifier, and the classifier may correspond to one or a plurality of processors. The processor may be implemented as an array of a plurality of logic gates, and it may also be implemented as a combination of a generic microprocessor and a memory storing programs that can be executed in the microprocessor.

A classifier may be implemented as a neural network-based classifier, a support vector machine (SVM), an Adaboost classifier, a Bayesian classifier, a perceptron classifier, etc. Hereinafter, an embodiment wherein the classifier in the disclosure is implemented as a convolutional neural network (CNN)-based classifier will be described. A neural network-based classifier is an operation model implemented to imitate the calculating ability of a biological system by using a lot of artificial neurons connected by a connecting line, and it performs a cognitive operation of a human or a learning process through a connecting line having connecting strength (a weight). However, the classifier in the disclosure is not limited thereto, and the classifier can obviously be implemented as the aforementioned various classifiers.

A general neural network includes an input layer, a hidden layer, and an output layer, and the hidden layer may include one or more layers depending on needs. A back propagation algorithm may be used as an algorithm for training such a neural network.

When certain data is input into an input layer of a neural network, the classifier may train the neural network such that output data for the input learning data is output to the output layer of the neural network. When feature information extracted from a photographed image is input, the classifier may classify the pattern of the feature information into any one class among several classes by using the neural network, and output the classification result.

The processor is a classification system by a series of machine learning algorithms based on a neural network, and it may use a recognition system based on deep learning.

FIG. 1 is a diagram for illustrating a process of recognizing an action of an object included in an image.

A user may use an artificial intelligence model to recognize a pose of an object included in a specific image. For example, if an image is input into an artificial intelligence model as input data, the artificial intelligence model may analyze the input image. An image learning network model may analyze the input image data, and acquire a result value for at least one of the category or the operation. In the embodiment according to FIG. 1, the image learning network model may acquire a result value including at least one information between the category which is physical training or the operation which is a push-up.

Figure 2:
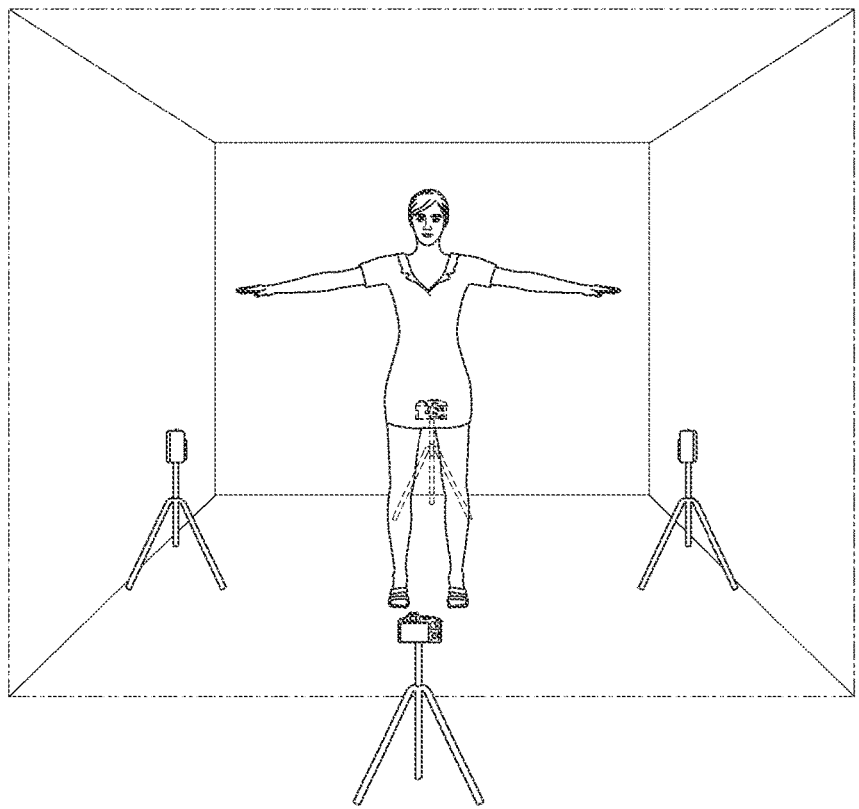
FIG. 2 is a diagram for illustrating a method of acquiring learning data through a motion capture method.
Figure 2:
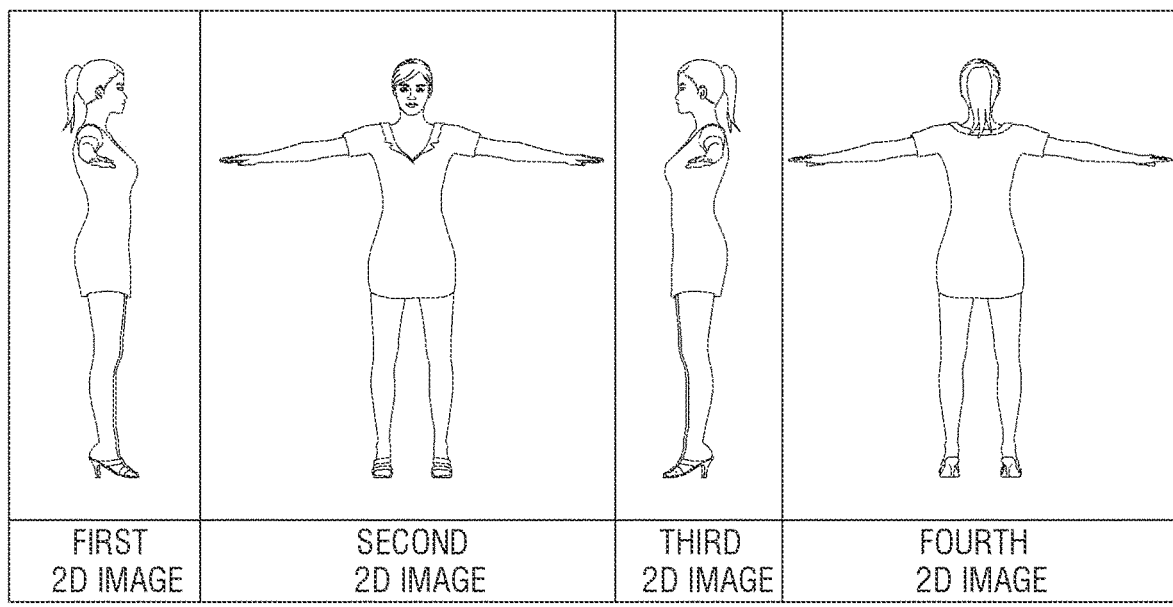

FIG. 2 is a diagram for illustrating a method of acquiring learning data through a motion capture method.

For generating the image learning network model mentioned in FIG. 1, a lot of data may be needed. Data for generating an image learning network model will be referred to as learning data. The electronic device 100 may generate an image learning network model of which recognition rate is higher or of which reliability of the result is higher as there is more learning data.

Meanwhile, a user may use a motion capture method to acquire learning data for generating an image learning network model. A motion capture method may mean a method of photographing an object by using a camera and generating learning data by using the photographed image. For example, a specific object may be photographed by using at least one camera in a studio. Here, in case there are a plurality of cameras, there may be a plurality of acquired 2D images. Then, a person may directly input information on the operation of the photographed object. Then, the electronic device 100 may match the image of the photographed object and the operation of the photographed object that a person directly input, and generate learning data.

However, generation of learning data by the motion capture method described in FIG. 2 may not be effective in the aspects of time and cost. As the image learning network model has to directly photograph all poses to be recognized, the cost may be high, and a lot of time may be taken. Also, in the case of an object bigger than a studio, it may be difficult to photograph the object. In addition, in case direct photographing in a studio is not easy like an animal, it may be difficult to generate learning data.

Figure 3:
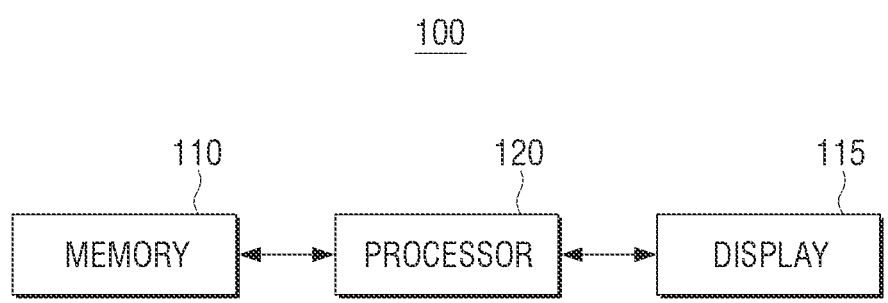
FIG. 3 is a block diagram for illustrating an electronic device according to an embodiment of the disclosure.

FIG. 3 is a block diagram for illustrating an electronic device according to an embodiment of the disclosure.

The electronic device 100 may include a memory 110, a display 115, and a processor 120.

The electronic device 100 may be a TV, a desktop PC, a laptop computer, a smartphone, a tablet PC, a server, etc. Alternatively, the electronic device 100 may be implemented as a system wherein a clouding computer environment is constructed itself, i.e., a cloud server. Specifically, the electronic device 100 may be a device including a recognition system based on deep learning. Meanwhile, the aforementioned example is merely an example for describing the electronic device, and the electronic device is not necessarily limited to the aforementioned device.

The memory 110 may be electronically connected to the processor 120, and it may be implemented as memories in various forms. For example, in the case of a memory embedded in the electronic device 100, it may be implemented as at least one of a volatile memory (e.g.: a dynamic RAM (DRAM), a static RAM (SRAM), or a synchronous dynamic RAM (SDRAM), etc.) or a non-volatile memory (e.g.: an one-time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard disc drive (HDD), or a solid state drive (SSD)). In the case of a memory that can be attached to or detached from the electronic device 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), an external memory that can be connected to a USB port (e.g., a USB memory), etc.

The memory 110 may store instructions or data related to at least one other component of the electronic device 100. For example, the memory 110 may store instructions for controlling the operations of the processor 120. According to an embodiment of the disclosure, the memory 110 may store instructions causing the processor 120 to control the display to display a 3D modeling image acquired by applying an input 2D image to a learning network model configured to convert the 2D image into a 3D modeling image.

Also, the memory 110 may store a learning network model according to an embodiment of the disclosure. Here, the learning network model may be a learning network model trained by using a 3D pose acquired by rendering virtual 3D modeling data and a 2D image corresponding to the 3D pose.

The display 115 may be implemented as displays in various forms such as a liquid crystal display (LCD), an organic light emitting diodes (OLED) display, a plasma display panel (PDP), etc. Inside the display, driving circuits that may be implemented in forms such as an a-si TFT, a low temperature poly silicon (LTPS) TFT, and an organic TFT (OTFT), etc., a backlight unit, etc. may also be included. Meanwhile, the display may be implemented as a touch screen combined with a touch sensor, a flexible display, a 3D display, etc.

Also, the display 115 according to an embodiment of the disclosure may include not only a display panel outputting images, but also a bezel housing the display panel. In particular, a bezel according to an embodiment of the disclosure may include a touch sensor (not shown) for detecting user interactions. The processor 120 may be electronically connected with the memory 110 and perform overall control operations of the electronic device. Specifically, the processor performs a function of controlling the overall operations of the electronic device.

The processor 120 may be implemented as a digital signal processor (DSP) processing digital image signals, a microprocessor, a time controller (TCON), etc. However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. Also, the processor may be implemented as a system on chip (SoC) having a processing algorithm stored therein or large scale integration (LSI), or in the form of a field programmable gate array (FPGA).

The processor 120 may be electronically connected with the display 115 and control the display.

Also, the processor 120 may input a 2D image into the learning network model according to an instruction stored in the memory 110, and display a 3D modeling image output from the learning network model on the display 115. Here, the 2D image may be a photographed image, e.g., at least one of a still image or a moving image.

Here, the learning network model may be a learning network model trained by using a 3D pose acquired by rending virtual 3D modeling data and a 2D image corresponding to the 3D pose, as described above. Here, the 3D modeling image may mean a virtual 3D character image. For example, it is assumed that an image wherein a boy is playing soccer was photographed through a camera. The image of the boy photographed by a camera may be included in a 2D image. When the 2D image is input into the learning network model, the learning network model may analyze the 2D image and identify an object included in the 2D image. The learning network model may identify that an object included in the 2D image is a boy, and the image that the boy is playing soccer. Then, the learning network model may generate a 3D modeling image wherein the boy is playing soccer. The 2D image may include an image of the actual boy who is playing soccer, and the 3D modeling image may include a scene wherein a virtual 3D character (a 3D character of the boy) is playing soccer.

That is, the learning network model may generate (acquire) a 3D modeling image corresponding to the input 2D image.

According to an embodiment of the disclosure, the processor 120 may perform control to generate a 2D image for learning by applying 3D modeling data to a 3D human model. Then, the processor 120 may generate a 3D modeling image by converting the 2D image for input through the learning network model. Here, the 3D modeling data may include various data used for acquiring a 3D modeling image. That is, a different 3D modeling image may be acquired according to different 3D modeling data.

For example, it is assumed that there is a 3D human model in the shape of a woman. In case the 3D human model who is a woman takes the four types of 3D poses illustrated in FIG. 9, 3D modeling data may vary according to each pose. When 3D modeling data is changed, a 3D modeling image output from the learning network model is changed, and thus the operation, the size, the direction, etc. of the 3D human model displayed on the display 115 may be changed.

Meanwhile, a 3D human model and a 3D character may be the same or similar in that they are virtual models displayed in a virtual space. However, in this specification, for the convenience of explanation, a virtual character used in a process of generating learning data is referred to as a 3D human model, and a virtual character corresponding to a 3D modeling image corresponding to an input 2D image is described as a 3D character. Meanwhile, in the case of using a 3D human model corresponding to a 2D image from the beginning, it is obvious that the 3D human model and a 3D character can be the same.

Meanwhile, the learning network model may transform a 3D human model into a plurality of 3D poses based on data and acquire at least one 2D image corresponding to each of the plurality of 3D poses, and it may be trained by using the plurality of 3D poses and at least one 2D image corresponding to each of the plurality of 3D poses. For example, it is assumed that a 3D human model is taking a 3D pose corresponding to a first pose. The 3D human model may be expressed as one image on the display 115. However, as the 3D human model is stereoscopic, it may be viewed in any direction in 360 degrees, and the size of the 3D human model may vary according to the viewing location. The 3D human model taking the first pose may acquire a plurality of 2D images according to the viewing location, the angle, the distance information (3D modeling data), etc. A detailed operation of acquiring a plurality of 2D images will be described later in FIG. 6 and FIG. 7.

The processor 120 may acquire 2D images for each of a plurality of poses taken by a 3D human model. In this case, there may be a plurality of 2D images corresponding to one pose. Specifically, even if a 3D human model takes one pose, there may be a plurality of 2D images corresponding to a plurality of directions. Here, a different direction may mean that a virtual direction (or a viewpoint of the camera) of viewing a 3D human model in a three-dimensional space may be different. For example, it is assumed that a 3D human model exists in a three-dimensional space. The 3D human model may display totally different images in the case of viewing from the front surface and in the case of viewing from the rear surface, and the processor 120 may acquire totally different 2D images in consideration of direction information. Here, the direction information may be a viewing location if it is assumed that a user is viewing the 3D human model. For example, the processor 120 may acquire a 2D image that a user can recognize if it is assumed that a user is viewing the 3D human model from the right side. This does not mean that a user can actually view the 3D human model from the right side, but assumes that the 3D human model generated in a virtual space is viewed from the right side of the virtual space.

Also, the learning network model may identify profile information of an object included in an input 2D image, and acquire a 3D human model corresponding to the profile information. Here, the profile information may mean information of an object included in an input 2D image. An object may correspond to a person or an animal, in general. Also, the profile information may mean various information that can specify the appearance (operation) of an object included in a 2D image. For example, the profile information may mean information corresponding to at least one of the sex, the age, the height, the face type, the hairstyle, or the operation. Here, the operation may be information indicating what kind of motion an object is taking.

Further, the learning network model may transform the pose of the 3D human model such that a plurality of body parts, divided based on joints included in the 3D human, model move within a predetermined angle range based on 3D modeling data, and acquire at least one 2D image corresponding to the transformed pose.

Here, the body parts mean parts of a body connecting between joints. For example, a part of a body connected between a joint of a wrist and an elbow may be a body part.

A 3D human model may include a plurality of joints. Here, a joint may mean a part wherein a bone and a bone are connected based on a person or an animal. In general, in a person or an animal, ranges wherein bones can move are limited according to specific joints. For example, a neck moves in up, down, left, and right directions, but a neck does not turn in 360 degrees. This is because a joint part limits a range wherein a bone can move. The learning network model may transform a pose of a 3D human model by applying different angles to each joint of the 3D human model. Then, the learning network model may acquire a 2D image corresponding to the transformed pose. Meanwhile, descriptions regarding joints will be made later in FIG. 11 and FIG. 12.

Also, the learning network model may transform a 3D human model into a 3D pose based on 3D modeling data, and acquire a plurality of 2D images corresponding to different directions with respect to the 3D pose. An operation of transforming a 3D human model into a specific pose will be described later in FIG. 9 and FIG. 10. Also, a process of acquiring a plurality of 2D images corresponding to different directions will be described later in FIG. 6 and FIG. 7.

Meanwhile, 3D modeling data may include at least one of angle data among a plurality of body parts divided based on joints included in a 3D human model, length data of each body part, or direction data of each body part. Descriptions regarding joints and a plurality of body parts will be made later in FIG. 11 and FIG. 12.

Also, the learning network model may learn weights of a neural network included in the learning network model by using a plurality of 3D poses and at least one 2D image corresponding to each of the plurality of 3D poses.

Meanwhile, if a user instruction for changing a user viewpoint is input, the processor 120 may input information corresponding to the user instruction into the learning network model. The learning network model may output a 3D modeling image based on the information corresponding to the user instruction. The 3D modeling image may be an image displaying a 3D character, and the user viewpoint is a standard of viewing from the stance of the user of the electronic device 100, and it may be similar meaning to a photographing time point of a camera.

Here, the user viewpoint may include at least one of a direction which the user is toward or a distance which the user is toward. For example, the viewpoint may vary in case the user of the electronic device 100 views a 3D character from the front surface in a virtual space, in case the user views a 3D character from the side surface, and in case the user views a 3D character from the rear surface. The content that a different 2D image may be acquired according to a viewpoint of a user will be described later in FIG. 6 and FIG. 7.

Also, the processor 120 may provide a UI for receiving input of pose information for transforming a 3D human model. Here, the UI may include category information or pose information. For example, in the soccer category, a heading pose, a shoot pose, a drawing pose, a sliding pose, etc. may be included. If a user selects a specific category, the processor 120 may input information corresponding to the category into the learning network model, and provide a 3D modeling image output from the learning network model on the display.

Meanwhile, the learning network model may transform a 3D human model into a plurality of poses and acquire at least one 2D image corresponding to each of the plurality of poses, and perform learning by using the plurality of poses and at least one 2D image corresponding to each of the plurality of poses.

For example, the learning network model may acquire a plurality of 2D images corresponding to a first pose based on a plurality of first 3D modeling data corresponding to the first pose, and acquire a plurality of 2D images corresponding to a second pose based on a plurality of second 3D modeling data corresponding to the second pose. Here, the first pose and the second pose may be different poses from each other.

Here, the first 3D modeling data may include at least one of first angle data among a plurality of body parts divided based on joints included in a 3D human model, first length data of each body part, or first direction data of each body part. The second 3D modeling data may include at least one of second angle data among a plurality of body parts divided based on joints included in a 3D human model, second length data of each body part, or second direction data of each body part.

For example, a plurality of 3D modeling data may exist for a pose of standing while spreading two arms. For example, even for the same actions of standing while spreading two arms, 3D modeling data may be different according to a difference in the angles of spreading two arms or a difference in the lengths by which two feet are distanced. For example, each 3D modeling data may be different in at least one of the angle data among body parts, the length data of body parts, or direction data of body parts, although the same poses are displayed. For example, for a pose of standing while spreading two arms, there may be a case wherein the angle of the arms and the torso is 90 degrees and a case wherein the angle is 85 degrees. Accordingly, the learning network model may learn different 3D modeling data for one pose.

Also, the learning network model may learn weights of a neural network by using a plurality of poses acquired based on different 3D modeling data and at least one 2D image corresponding to each of the plurality of poses. For example, the learning network model may learn weights of a neural network by using a plurality of poses acquired based on at least one of an angle among a plurality of body parts divided based on joints included in a 3D human model, the length of each body part, or the direction of each body part, and at least one 2D image corresponding to each of the plurality of poses.

The disclosure discloses an operation of generating a virtual object and transforming the object in a virtual space, and acquiring a plurality of 2D images in consideration of various direction information. According to the disclosure, an actual object does not have to be photographed, and thus time and cost can be saved.

In an artificial intelligence learning network model, the recognition rate can get better as there is more learning data. As various learning data can be generated by a method as in the disclosure, the disclosure can be helpful in generating an artificial intelligence model having a good recognition rate.

Also, a motion capture method using an actual model (actor) needs a post-processing job, and thus a lot of time may be spent for generating learning data. However, according to the disclosure, a post-processing job is not separately needed, and a program automatically acquires a 2D image, and thus time for generating learning data can be reduced.

Meanwhile, in the method according to the disclosure, a virtual 3D human model is used, and thus there may be a deviation compared to using an actual model. For removing such a deviation, learning data may be generated by using both of a 2D image acquired from a 3D human model and a 2D image acquired from an actual object (an object photographed by the camera).

Meanwhile, in the aforementioned embodiment, it was described that the display is included in the electronic device 100, but in actual implementation, the electronic device 100 may perform only operations related to the learning network model, and an operation of displaying a 3D human model may be performed in a separate display device.

Also, for generating an action that is difficult to be photographed in a studio as learning data, there may be a lot of limitations in a conventional method. For example, in sport actions, it may be very difficult to photograph a specific action. In the case of staying still in the air or a pose that is difficult to be taken by a model (an actor), it may be difficult to generate learning data. However, according to the method of the disclosure, learning data can be generated easily through simulation. Also, as learning data for various angles and directions is generated, an effect that the recognition rate rather increases can be expected.

Meanwhile, in the aforementioned description, a 3D character was described while limiting that it is a 3D human model, i.e., a person. However, this is merely an example, and a 3D character may be an animal other than a 3D human model. Accordingly, a learning network model according to the disclosure may be a learning network model for recognizing an appearance or a pose of an animal According to another embodiment of the disclosure, the learning network model may be a learning network model for recognizing objects other than people or animals.

Figure 4:
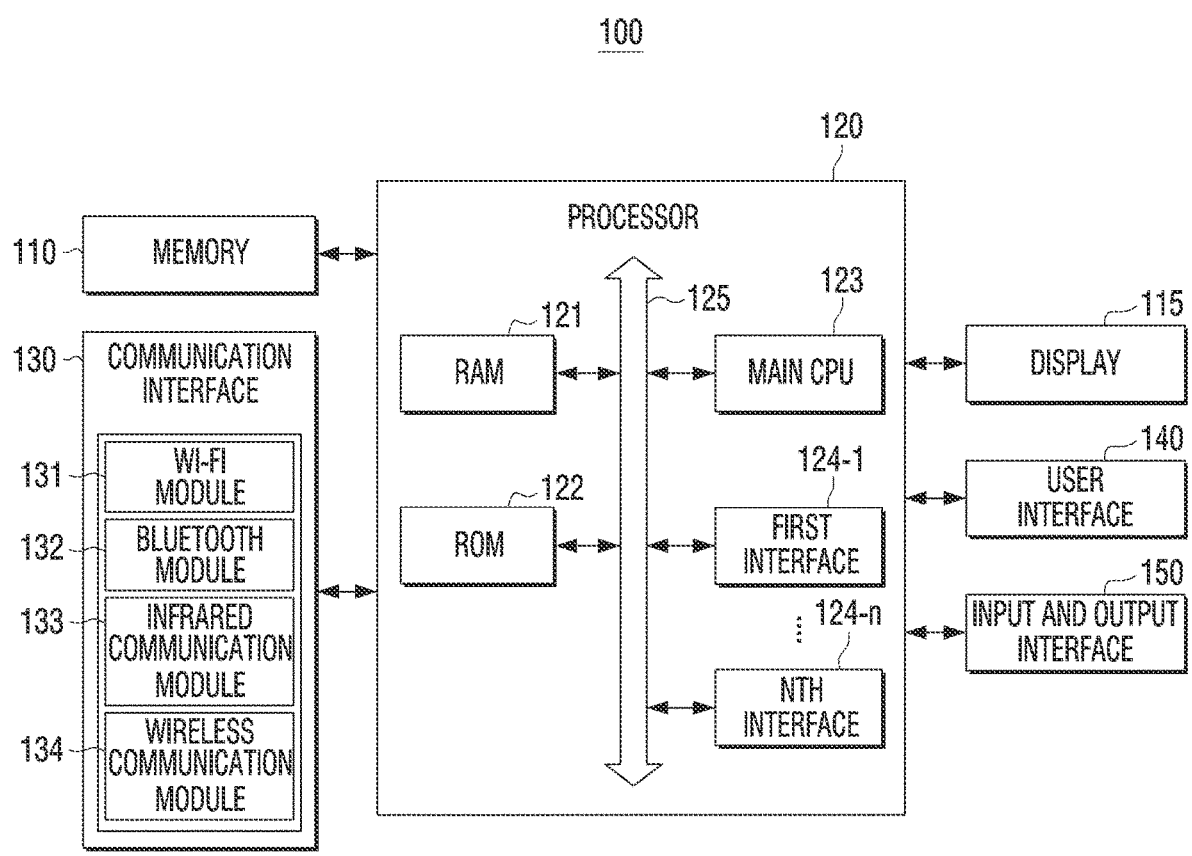
FIG. 4 is a block diagram for illustrating a detailed configuration of the electronic device in FIG. 3.

FIG. 4 is a block diagram for illustrating a detailed configuration of the electronic device in FIG. 3.

Referring to FIG. 4, the electronic device 100 according to an embodiment of the disclosure may include a memory 110, a display 115, a processor 120, a communication interface 130, a user interface 140, and an input and output interface 150.

Among the operations of the memory 110 and the processor 120, regarding operations that are the same as those described before, overlapping explanation will be omitted.

The processor 120 controls the overall operations of the electronic device 100 by using various kinds of programs stored in the memory 110.

Specifically, the processor 120 includes a RAM 121, a ROM 122, a main CPU 123, first to nth interfaces 124-1-134-*n*, and a bus 125.

The RAM 121, the ROM 122, the main CPU 123, and the first to nth interfaces 124-1-134-*n* may be connected with one another through the bus 125.

In the ROM 122, a set of instructions for system booting, etc. are stored. When a turn-on instruction is input and power is supplied, the main CPU 123 copies the O/S stored in the memory 110 in the RAM 121 according to the instruction stored in the ROM 122, and boots the system by executing the O/S. When booting is completed, the main CPU 123 copies various kinds of application programs stored in the memory 110 in the RAM 121, and performs various kinds of operations by executing the application programs copied in the RAM 121.

The main CPU 123 accesses the memory 110, and performs booting by using the O/S stored in the memory 110. Then, the main CPU performs various operations by using various kinds of programs, content data, etc. stored in the memory 110.

The first to nth interfaces 124-1 to 134-*n* are connected with the aforementioned various kinds of components. One of the interfaces may be a network interface connected with an external device through a network.

Meanwhile, the processor 120 may perform a graphic processing function (a video processing function). For example, the processor 120 may generate a screen including various objects such as icons, images, and texts by using an operation part (not shown) and a rendering part (not shown). Here, the operation part (not shown) may operate attribute values such as coordinate values, shapes, sizes, and colors by which each object will be displayed according to the layout of the screen based on a received control instruction. Then, the rendering part (not shown) may generate screens in various layouts including objects, based on the attribute values operated at the operation part (not shown). Also, the processor 120 may perform various kinds of image processing such as decoding, scaling, noise filtering, frame rate conversion, and resolution conversion of video data.

Meanwhile, the processor 120 may perform processing for audio data. Specifically, at the processor 120, various kinds of processing such as decoding or amplification, noise filtering, etc. of audio data may be performed.

Meanwhile, the processor 120 may include a graphic processing unit (GPU) or a neural processing unit (NPU). A GPU may correspond to a high performance processing device for graphic processing, and an NPU is an AI chipset and it may be an AI accelerator. Meanwhile, an NPU may correspond to a processing device that executes a deep learning model in place of or together with a GPU.

The communication interface 130 is a component performing communication with various types of external devices according to various types of communication methods. The communication interface 130 includes a Wi-Fi module 131, a Bluetooth module 132, an infrared communication module 133, and a wireless communication module 134, etc. The processor 120 may perform communication with various kinds of external devices by using the communication interface 130. Here, external devices may include a display device like a TV, an image processing device like a set-top box, an external server, a control device like a remote control, an audio outputting device like a Bluetooth speaker, a lighting device, home appliances like a smart cleaner and a smart refrigerator, a server like an IoT home manager, etc.

The Wi-Fi module 131 and the Bluetooth module 132 perform communication by a Wi-Fi method and a Bluetooth method, respectively. In the case of using the Wi-Fi module 131 or the Bluetooth module 132, various types of connection information such as an SSID and a session key is transmitted and received first, and connection of communication is performed by using the information, and various types of information can be transmitted and received thereafter.

The infrared communication module 133 performs communication according to an infrared Data Association (IrDA) technology of transmitting data to a near field wirelessly by using infrared rays between visible rays and millimeter waves.

The wireless communication module 134 means a module that performs communication according to various communication standards such as Zigbee, 3rd Generation (3G), 3rd Generation Partnership Project (3GPP), LTE (Long Term Evolution), LTE Advanced (LTE-A), 4th Generation (4G), 5th Generation (5G), etc. other than the aforementioned Wi-Fi module 131 and Bluetooth module 132.

Other than the above, the communication interface 130 may include at least one of a local area network (LAN) module, an Ethernet module, or a wired communication module that performs communication by using a pair cable, a coaxial cable, or an optical fiber cable, etc.

According to an embodiment of the disclosure, the communication interface 130 may use the same communication module (e.g., a Wi-Fi module) for communicating with an external device like a remote control and an external server.

According to another embodiment of the disclosure, the communication interface 130 may use different communication modules (e.g., a Wi-Fi module) for communicating with an external device like a remote control and an external server. For example, the communication interface 130 may use at least one of an Ethernet module or a Wi-Fi module for communicating with an external server, and may use a BT module for communicating with an external device like a remote control. However, this is merely an example, and the communication interface 130 may use at least one communication module among various communication modules in the case of communicating with a plurality of external devices or external servers.

Meanwhile, the communication interface 130 may further include a tuner and a demodulation part depending on implementation examples.

The tuner (not shown) may tune a channel selected by a user in a radio frequency (RF) signal received through an antenna or all prestored channels and receive an RF broadcasting signal.

The demodulation part (not shown) may receive a digital IF (DIF) signal converted at the tuner and demodulate the signal, and perform channel demodulation, etc.

The user interface 140 may be implemented as a device such as a button, a touch pad, a mouse, and a keyboard, or implemented as a touch screen that can perform the aforementioned display function and a manipulation input function together. Here, a button may be various types of buttons such as a mechanical button, a touch pad, a wheel, etc. formed in any areas such as the front face part, the side surface part, the rear surface part, etc. of the exterior of the main body of the electronic device 100.

The input and output interface 150 may be an interface of any one of a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI).

An HDMI is an interface that can transmit high performance data for AV devices that input and output audio and video signals. A DP is an interface that can implement not only screens of full HD of 1920×1080 but also screens of ultra high definition like 2560×1600 or 3840×2160, and 3D stereoscopic images, and that can also transmit digital voices. A Thunderbolt is an input and output interface for transmission and connection of high speed data, and can connect in parallel a PC, a display, a storage device, etc. with one port.

The input and output interface 150 may input and output at least one of an audio signal or a video signal.

Depending on implementation examples, the input and output interface 150 may include a port inputting and outputting only audio signals and a port inputting and outputting only video signals as separate ports, or implemented as one port that inputs and outputs both audio signals and video signals.

Communication modules for communication with an external device and an external server may be implemented as one. For example, communication modules for communication with an external device and an external server may be the same as a Wi-Fi module.

Also, communication modules for communication with an external device and an external server may be implemented separately. For example, communication with an external device may be performed by using a Bluetooth module, and communication with an external server may be performed by using an Ethernet model or a Wi-Fi module.

Figure 5:
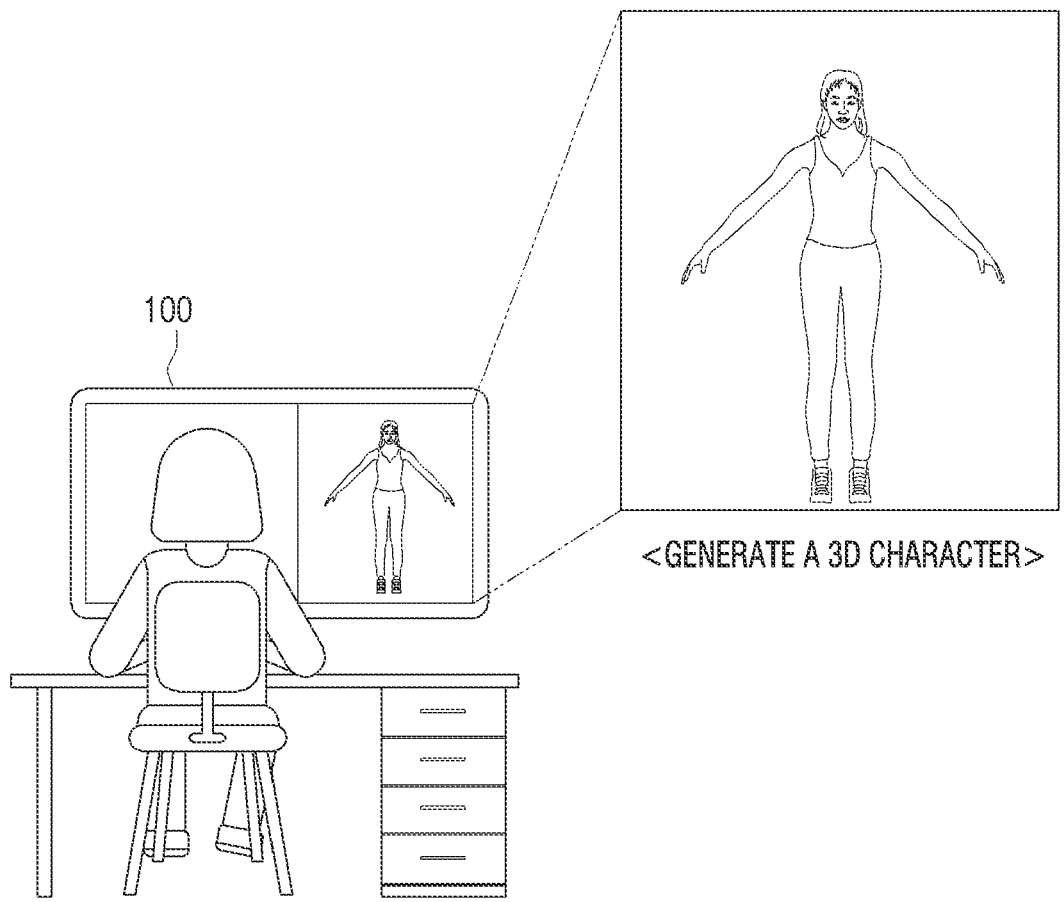
FIG. 5 is a diagram for illustrating an operation of generating a 3D human model.

FIG. 5 is a diagram for illustrating an operation of generating a 3D human model.

For generating an image learning network model, a user may generate a 3D human model (3D character) by using the electronic device 100, and control the electronic device 100 to make the 3D human model take a specific pose. Here, for the 3D human model, various models (characters) may be generated according to the user's setting. Then, the user may control the electronic device 100 to acquire a 2D image by using the 3D human model that took a specific pose. The aforementioned operation can be referred to as a 3D human model (3D character) capture method. While the motion capture method described in FIG. 2 is a method of photographing an actual object by using a camera, the 3D human model (3D character) capture method described in FIG. 5 does not use a camera. In the 3D human model capture method, a 2D image is acquired based on a 3D human model virtually generated. A specific method of acquiring a 2D image will be described later in FIG. 6 and FIG. 7.

Meanwhile, an embodiment according to the disclosure describes a 3D human model, but the model is not necessarily limited to a human model. For example, the model may be an animal model but not a human model. According to another embodiment of the disclosure, the electronic device 100 may use various object models.

Figure 6:
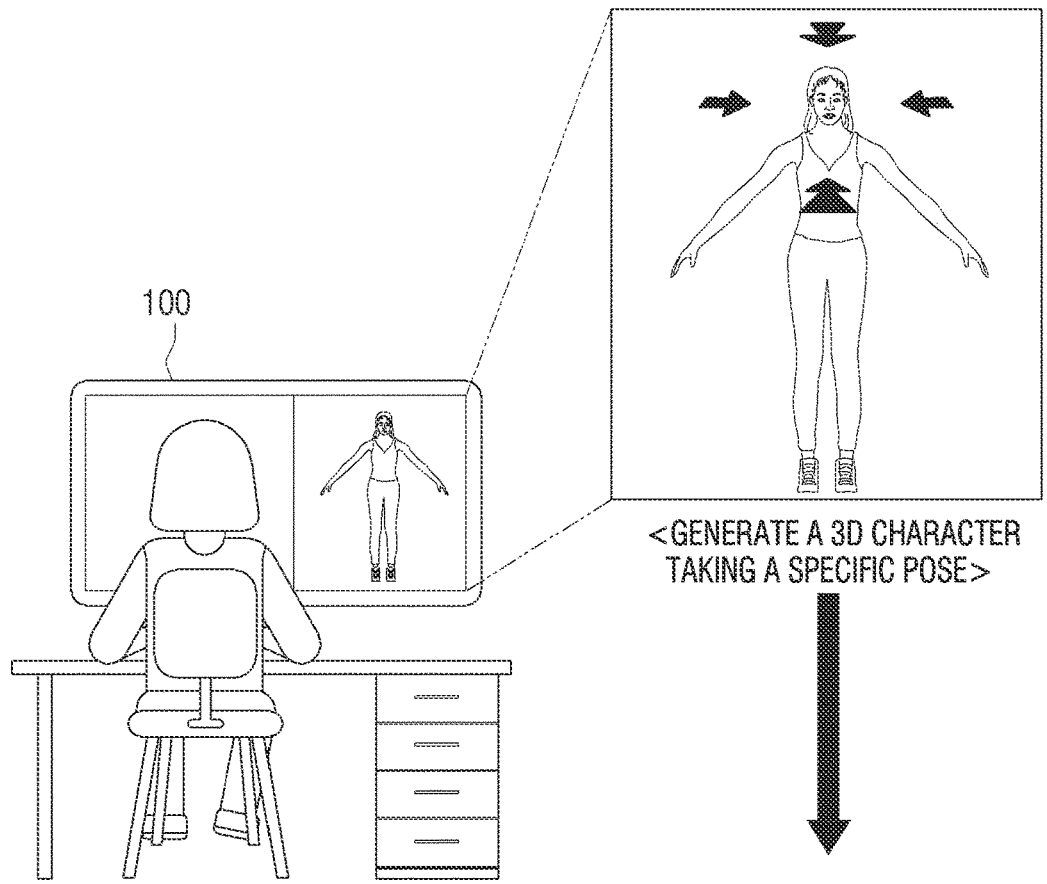
FIG. 6 is a diagram for illustrating an operation of acquiring a 2D image according to an embodiment of the disclosure by using the 3D human model generated in FIG. 5.
Figure 6:
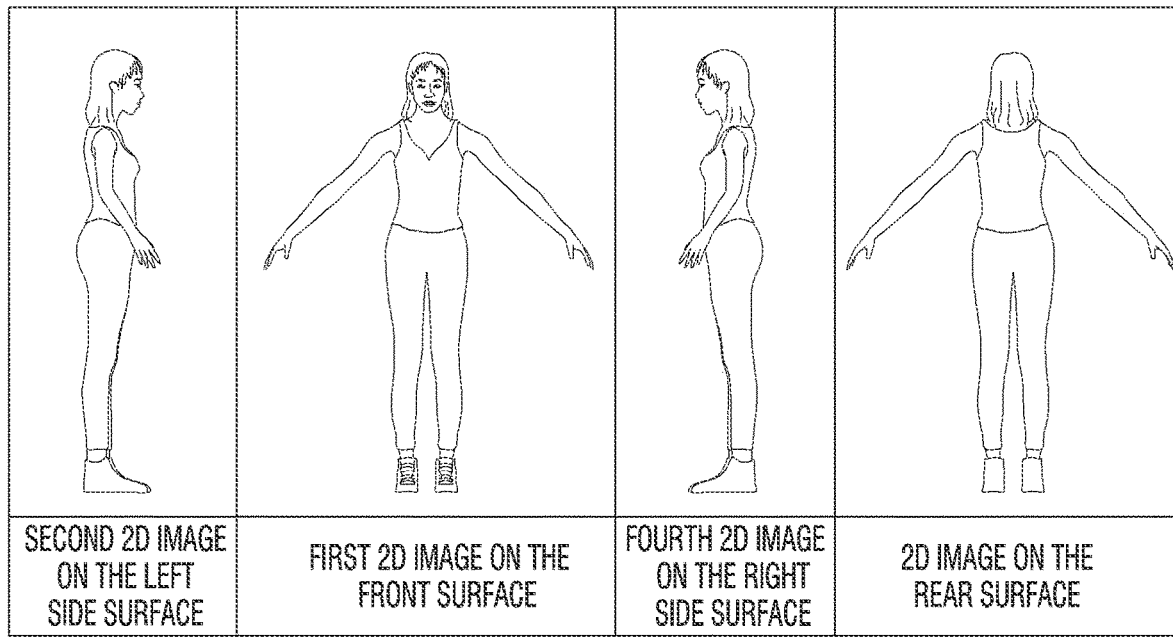

FIG. 6 is a diagram for illustrating an operation of acquiring a 2D image according to an embodiment of the disclosure by using the 3D human model generated in FIG. 5.

The electronic device 100 may control a generated 3D human model to take a specific pose. Here, a specific pose may be a pose according to a user's setting. For example, if a user inputs a control instruction for making the 3D human model take a pose of spreading arms into the electronic device 100, the electronic device 100 may control the 3D human model to take a pose of spreading arms. Here, the electronic device 100 may include a display, and the electronic device 100 may display a pose that the 3D human model is spreading arms on the display.

Meanwhile, the electronic device 100 may acquire a 2D image based on a 3D human model taking a specific pose. Specifically, the electronic device 100 may generate a 3D human model in a three-dimensional space, and the electronic device 100 may acquire a 2D image based on a direction of viewing the 3D human model in the three-dimensional space.

Referring to FIG. 6, there is a 3D human model facing the front on the display of the electronic device 100. Here, the electronic device 100 may acquire a front surface image, a left side surface image (the left side from the viewpoint of viewing the 3D character), a rear surface image, and a right side surface image (the right side from the viewpoint of viewing the 3D character) of the 3D human model.

A front surface image may be an image viewing the 3D human model generated in the three-dimensional space from the front surface. Here, the meaning of viewing the 3D human model from the front surface may be acquiring information of a 2D image that can be recognized when viewed from the front surface (the front surface based on the 3D human model) from the stance of a user. A left side surface image may mean information of a 2D image that can be recognized when viewed from the left side surface (the right side surface based on the 3D human model) from the stance of a user using the display of the electronic device 100. A rear surface image may mean information of a 2D image that can be recognized when viewed from the rear surface (the rear surface based on the 3D human model) from the stance of a user using the display of the electronic device 100. A right side surface image may mean information of a 2D image that can be recognized when viewed from the right side surface (the left side surface based on the 3D human model) from the stance of a user using the display of the electronic device 100.

In FIG. 6, a method of acquiring a 2D image according to four directions was described. However, this is merely an example, and a 2D image viewing a 3D human model in a three-dimensional space can be acquired in any direction. That is, the electronic device 100 can acquire a 2D image based on a 3D human model in any direction in 360 degrees.

As the electronic device 100 includes three-dimensional image information for a 3D human model, the electronic device 100 may acquire information of an image that can be recognized when viewed in a specific direction. For example, for acquiring a 2D image as viewed in a specific direction, the electronic device 100 may remove information of a specific dimension in three-dimensional image information, and acquire only two-dimensional image information. Then, the electronic device 100 may acquire a plurality of 2D images for one pose that a 3D human model took by the method described in FIG. 6.

Figure 7:
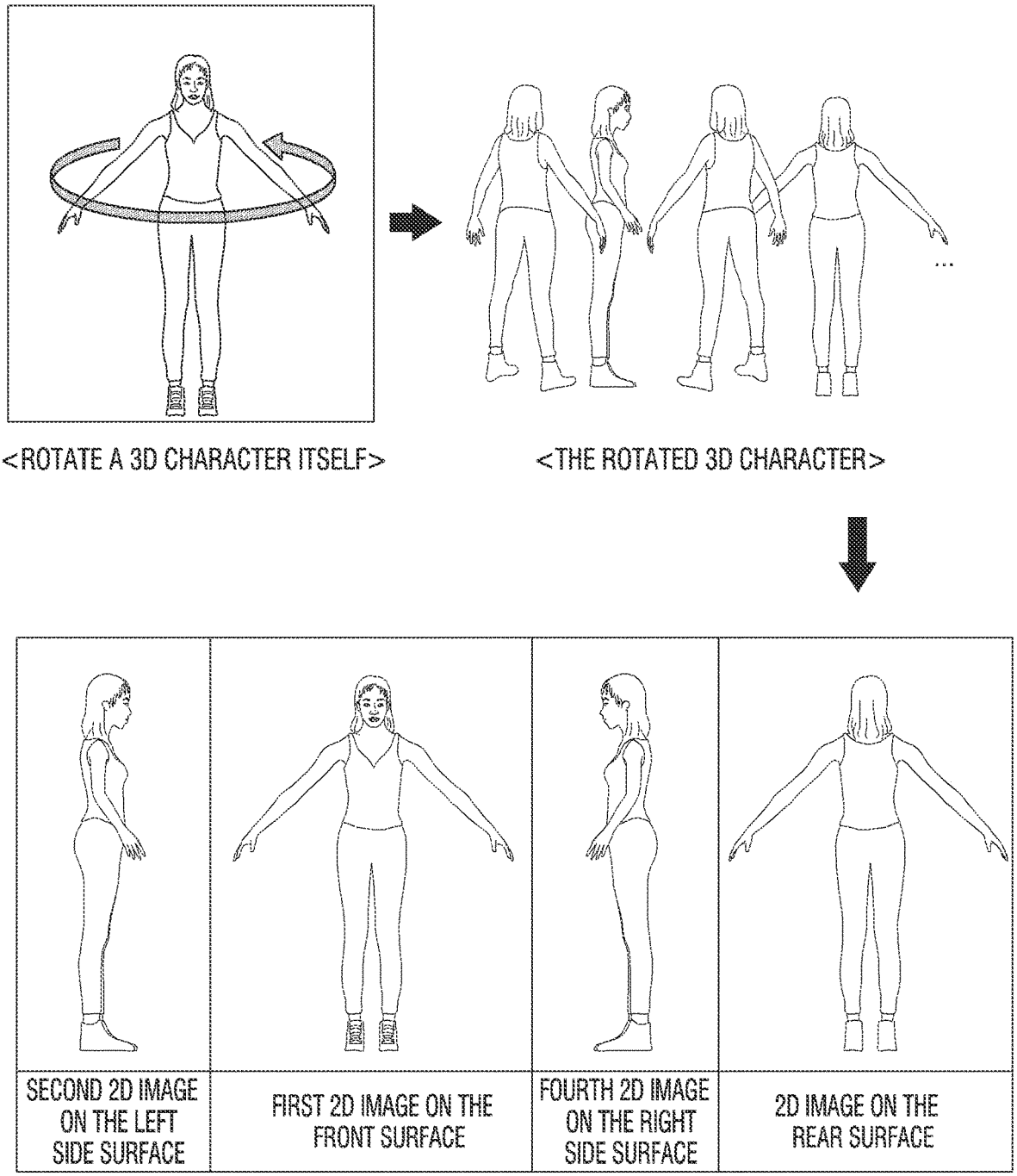
FIG. 7 is a diagram for illustrating an operation of acquiring a 2D image according to another embodiment of the disclosure by using the 3D human model generated in FIG. 5.

FIG. 7 is a diagram for illustrating an operation of acquiring a 2D image according to another embodiment of the disclosure by using the 3D human model generated in FIG. 5.

Referring to FIG. 7, the electronic device 100 may rotate a generated 3D human model in various angles. Then, the electronic device 100 may display the 3D human model rotated in various angles as if it is rotated in a three-dimensional space on the display. Then, the electronic device 100 may acquire a 2D image by using the rotated 3D human model. For example, the electronic device 100 may acquire a 2D image of the 3D human model by performing "a print screen function" according to the rotation of the 3D human model. "A print screen function" may mean capturing an image of a specific area displayed on the display as it is shown.

Referring to FIG. 7, the electronic device 100 may acquire a 2D image of the 3D human model rotated according to user setting or a predetermined event through "a print screen function." Then, the electronic device 100 may acquire a plurality of 2D images for one pose that the 3D human model took by the method described in FIG. 7.

Figure 8:
FIG. 8 is a diagram for illustrating an operation of acquiring learning data based on the 2D image acquired by FIG. 7.

FIG. 8 is a diagram for illustrating an operation of acquiring learning data based on the 2D image acquired by FIG. 7.

It is assumed that the electronic device 100 acquired front surface, left side surface, rear surface, and right side surface images (four kinds of 2D images in total) as in FIG. 7. The electronic device 100 may generate learning data by using the 2D images. The electronic device 100 may match the acquired 2D images with a specific pose for generating learning data.

For example, in FIG. 7, the 3D human model may take a pose of spreading arms. The electronic device 100 may control the 3D human model to take a pose of spreading arms according to a user instruction, and the electronic device 100 may display a screen of the 3D human model taking a pose of spreading arms on the display. Here, the pose of spreading arms (the first pose) may be the name of the pose. Also, the category of the pose may be directly defined by the user. The pose of spreading arms described in FIG. 7 may correspond to a category of "basic postures."

Referring to FIG. 7, the electronic device 100 may match 2D images with at least one of a category or a pose. Then, the electronic device 100 may use the matched information as learning data. The electronic device 100 may use a plurality of 2D images corresponding to one pose as learning data. The electronic device 100 may transmit a plurality of 2D images to a learning data acquisition part. Then, the electronic device 100 may generate an image learning network model by using the 2D images acquired at the learning data acquisition part. The learning data acquisition part will be described in detail later in FIG. 15 to FIG. 17.

In one category, a plurality of poses may be included. For example, basic postures may include various poses such as a pose of spreading arms, a pose of gathering arms, a pose of sitting and placing arms on knees, a pose of gathering arms and lowering the hand, etc.

Also, one pose may be included in a plurality of categories. For example, a kicking pose may be included in various categories such as a soccer category, a martial arts category, a rugby category, etc. Here, in case an image input into the image learning network model corresponds to a kicking pose, the electronic device 100 may acquire probability values that will correspond to the soccer category, the martial arts category, and the rugby category. Also, the electronic device 100 may determine the category having the highest probability value as the finally recognized output value.

Figure 9:
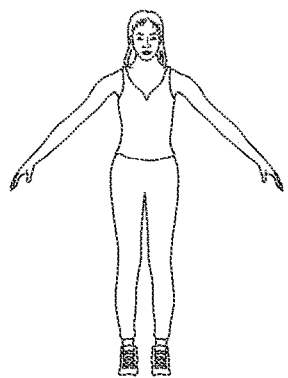
FIG. 9 is a diagram for illustrating a plurality of poses that are applicable to a 3D human model.
Figure 9:
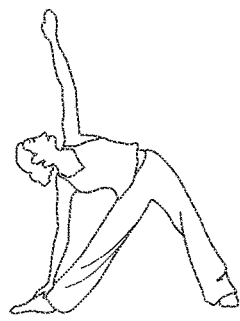
Figure 9:
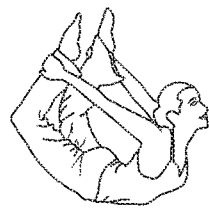
Figure 9:
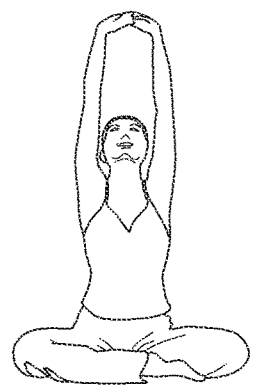

FIG. 9 is a diagram for illustrating a plurality of poses that are applicable to a 3D human model.

Referring to FIG. 9, the electronic device 100 may use a 3D human model and control the model to take various poses. For example, the electronic device 100 may control a 3D human model to take any one pose among the first pose, the second pose, the third pose, and the fourth pose. The first to fourth poses are poses different from one another, and the electronic device 100 may display images of the 3D human model corresponding to each pose on the display.

For example, the electronic device 100 may display images corresponding to the 3D human model taking a plurality of poses according to a user's input. Then, the electronic device 100 may acquire 2D images by using the 3D human model taking a plurality of poses by the method described in FIG. 6 or FIG. 7. Then, the electronic device 100 may acquire a plurality of 2D images for each pose (the first pose to the fourth pose).

FIG. 10 is a diagram for illustrating an operation of acquiring learning data based on the 2D image acquired by FIG. 9.

The electronic device 100 may generate learning data by using a plurality of 2D images corresponding to each of the plurality of poses acquired by FIG. 9. Specifically, the electronic device 100 may match the acquired 2D images with at least one of a category or a pose name. For example, it is assumed that the first pose to the fourth pose correspond to the category of yoga postures. The electronic device 100 may match at least one of the yoga postures (a category) or the first pose (a pose name) with 2D images corresponding to the first pose. In the same manner, the electronic device 100 may match at least one of the yoga postures (a category) or the second pose (a pose name) with 2D images corresponding to the second pose. In this case, there may be a plurality of 2D images corresponding to the first pose (the second pose) for each pose. Then, the electronic device 100 may transmit the plurality of matched information to the learning data acquisition part. The learning data acquisition part may generate an image learning network model by using the acquired 2D image matching information.

Figure 11:
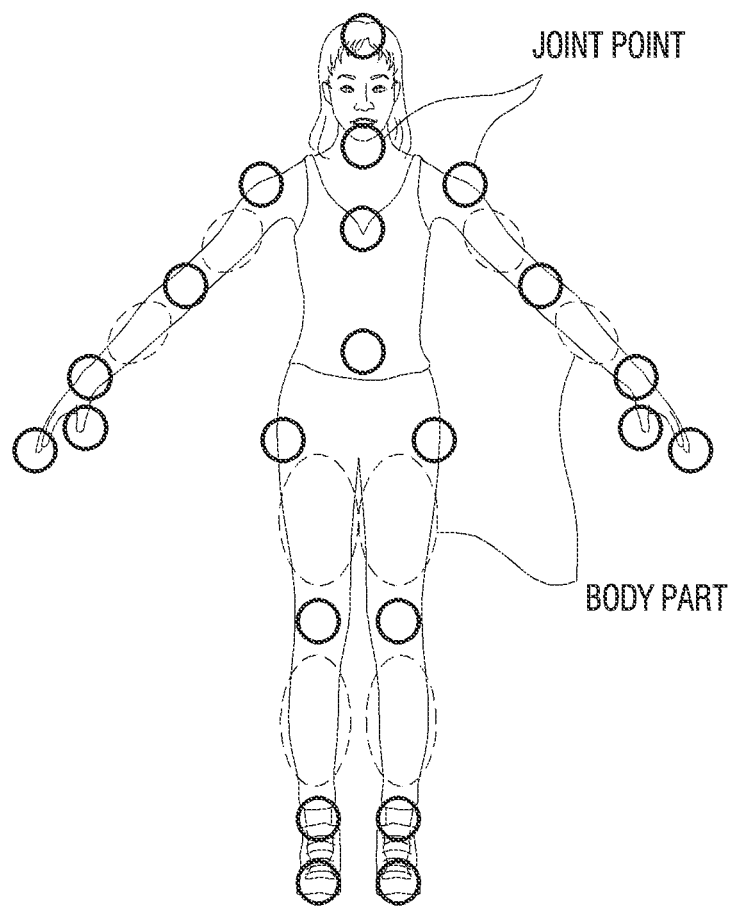
FIG. 11 is a diagram for illustrating joint points of a 3D human model.

FIG. 11 is a diagram for illustrating joint points of a 3D human model.

Referring to FIG. 11, the electronic device 100 may acquire joint points of a 3D human model according to user setting. A joint point may mean a part wherein a bone and a bone are connected based on a person or an animal. In general, in a person or an animal, ranges wherein bones can move are limited according to specific joints. For example, a neck moves in up, down, left, and right directions, but a neck does not turn in 360 degrees. This is because a joint part limits a range wherein a bone can move.

The electronic device 100 may perform control to display an image wherein a 3D human model takes a specific pose by using joint points. Specifically, joint points of a 3D human model may be the head, the shoulder, the neck, the chest, the stomach, the back, the pelvis, the elbows, the wrists, the knuckles, the knees, the ankles, the toe joints, etc. Here, the electronic device 100 may use only specific joint points among the aforementioned joint points such that the 3D human model takes a specific pose. In the case of using a lot of joint points, the data processing speed of the electronic device 100 may become slow. Accordingly, the electronic device 100 may control (manipulate) the 3D human model by using only some joint points for the data processing speed. Which joint points will be used may be determined according to user setting.

According to another embodiment of the disclosure, the electronic device 100 may additionally designate the joint points of a 3D human model.

Figure 12:
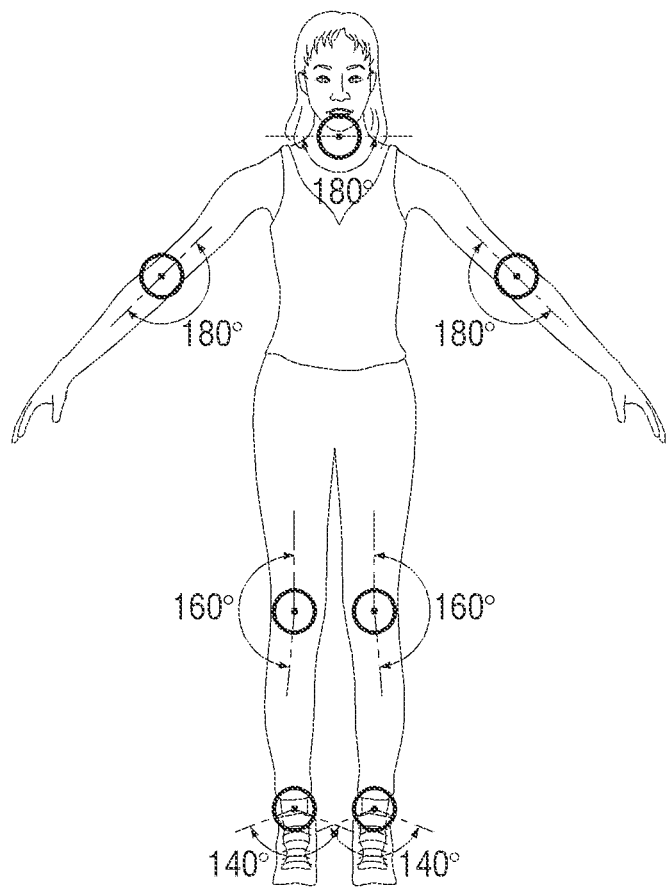
FIG. 12 is a diagram for illustrating movements of body parts contacting the joint points of the 3D human model according to FIG. 11.

FIG. 12 is a diagram for illustrating movements of body parts contacting the joint points of the 3D human model according to FIG. 11.

The electronic device 100 may generate various poses to be used for learning data. Here, the electronic device 100 may transform the pose of a 3D human model based on a specific pose for automatically generating various poses. Then, the electronic device 100 may display the appearance of the 3D human model taking the transformed pose on the display.

For example, for transforming a 3D human model taking the first pose, the electronic device 100 may move body parts corresponding to some joint points in the first pose. Then, the electronic device 100 may capture the 3D human model acquired by moving body parts and acquire a 2D image.

Here, the body parts mean parts of a body connecting between joints. For example, a part of a body connected between a joint of a wrist and an elbow may be a body part.

As described in FIG. 11, for each joint point, a range wherein bones connected to the joint point can move may be limited. In manipulating a 3D human model, the electronic device 100 may make limitation such that bones move within a specific angle in specific joint points.

For example, a neck joint may be set such that the neck moves only to 180 degrees to the left and to the right. In FIG. 12, only angles on the left and right sides are displayed, but in actual implementation, angles in up and down directions may also be set. Also, an elbow joint may be set such that an arm portion moves only to 180 degrees. Further, different angles may be applied to each joint. For example, a knee joint may be set such that a leg portion moves only to 160 degrees. Also, an ankle joint may be set such that a foot portion moves only to 140 degrees. The electronic device 100 may apply different angles to a plurality of joints, and for joints to which different angles are applied, the electronic device 100 may perform control such that body parts connected to joints move only to different angles. Also, the electronic device 100 may generate poses of a 3D human model in consideration of the angle limitation applied to joints described in FIG. 12.

Meanwhile, in FIG. 12, only any one direction of a joint was described as an example, and for one joint, a plurality of angle limitations may be set according to the axis.

Figure 13:
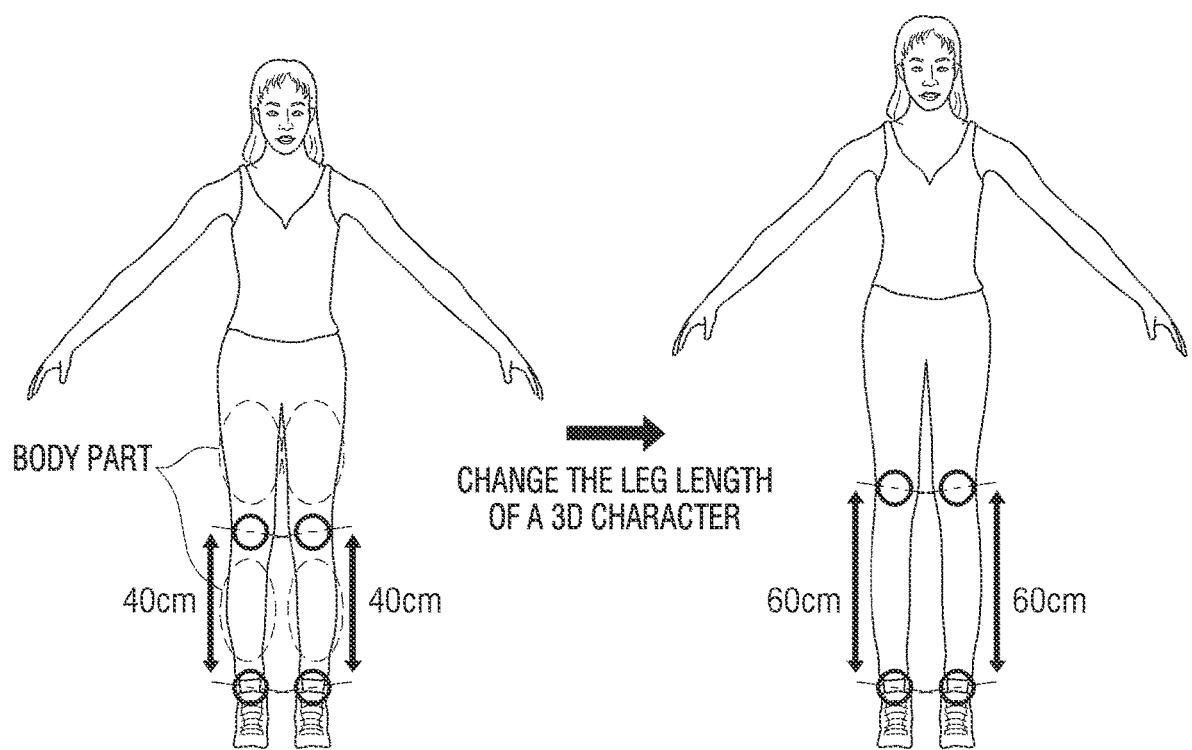
FIG. 13 is a diagram for illustrating an operation of changing a specific body part of a 3D human model.

FIG. 13 is a diagram for illustrating an operation of changing a specific body part of a 3D human model.

Referring to FIG. 13, the electronic device 100 may generate a new 3D human model by changing the length of a body part connected between a specific joint and a specific joint. For example, it is assumed that a body part between an ankle joint and a knee joint is set as 40 cm. For generating various learning data, learning data for a taller person may be needed. In this case, the electronic device 100 may acquire learning data by lengthening the height of the existing 3D human model. For generating a tall 3D human model, the electronic device 100 may transform the body part between an ankle joint and a knee joint from 40 cm to 60 cm.

The electronic device 100 may acquire a 2D image by using one 3D human model, and it may also acquire a 2D image by using a plurality of 3D human models. A 3D human model may be generated by various methods by using body information such as the sex, the weight, the height, etc. In the case of acquiring a 2D image for various 3D human models, the recognition rate may become higher.

The electronic device 100 according to the disclosure may acquire a 2D image of various 3D human models taking a specific pose easily by using a virtual 3D human model, without using various actual models. By using a virtual 3D human model, the disclosure can have an effect of saving the time and the cost.

Figure 14:
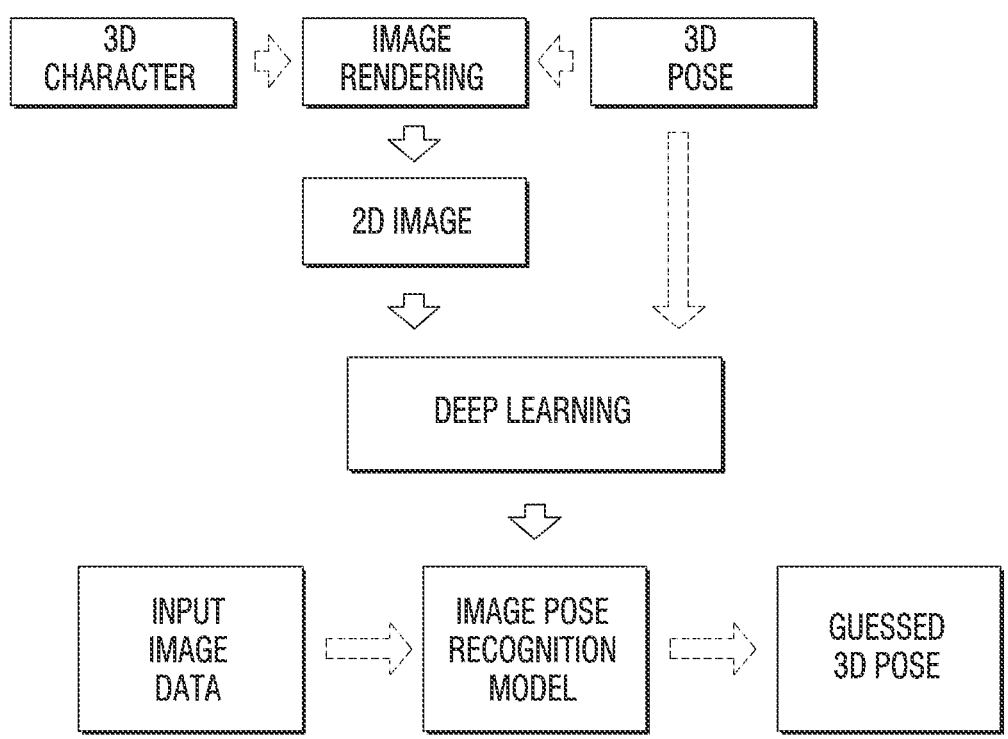
FIG. 14 is a diagram for illustrating a method of generating an image learning network model according to an embodiment of the disclosure.

FIG. 14 is a diagram for illustrating a method of generating an image learning network model according to an embodiment of the disclosure.

The electronic device 100 may generate a 3D human model according to user setting. Then, the electronic device 100 may control the 3D human model to take a 3D pose according to user setting. Ultimately, the electronic device 100 may display the 3D human model taking a specific 3D pose on the display, and the electronic device 100 may acquire a 2D image according to the content described in FIG. 6 or FIG. 7.

Then, the electronic device 100 may generate learning data by matching a specific 3D pose and a 2D image corresponding to the specific 3D pose. Then, the electronic device 100 may perform deep learning by using the generated learning data and generate an image learning network model.

The electronic device 100 may perform a pose recognition operation for input data by using the generated image learning network model. The electronic device 100 may analyze input data stored in an external device or stored in advance by using the image learning network model, and guess (determine, infer) the subject of the object included in the input data and what kind of pose the subject of the object is taking.

The various operations described to be performed by the electronic device 100 in the aforementioned embodiments may be performed in a learning network according to an embodiment of the disclosure.

Figure 15:
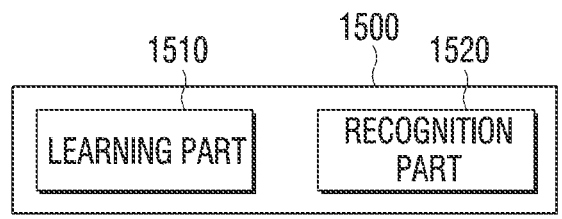
FIGS. 15 to 17 are diagrams for illustrating operations of a learning part and a recognition part.
Figure 16:
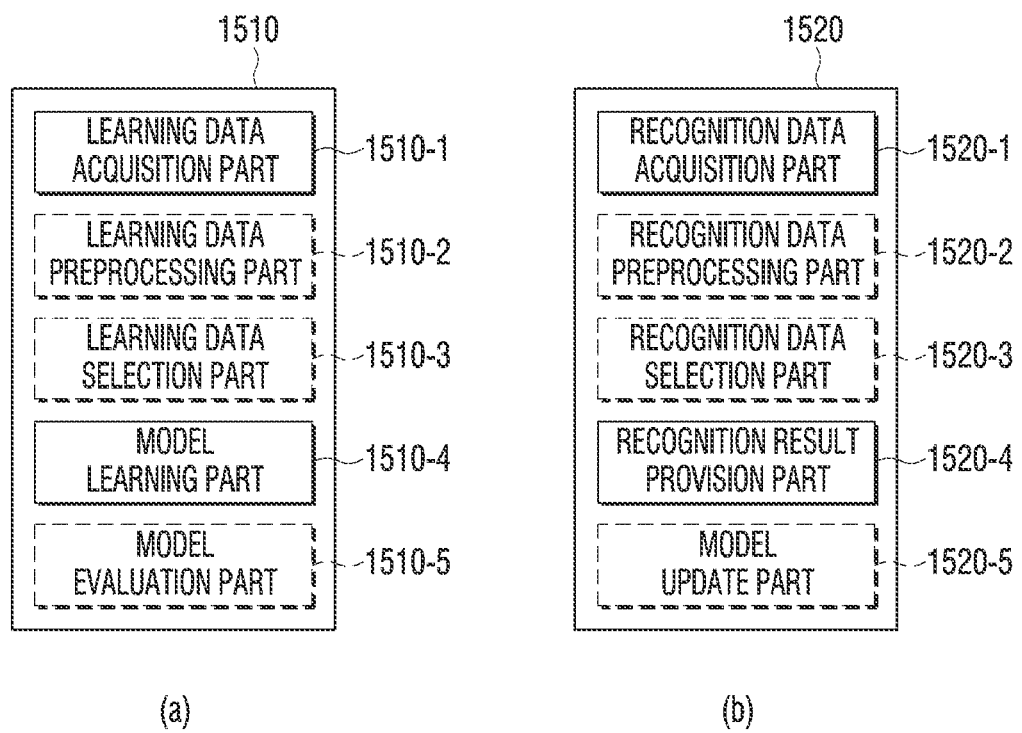
Figure 17:
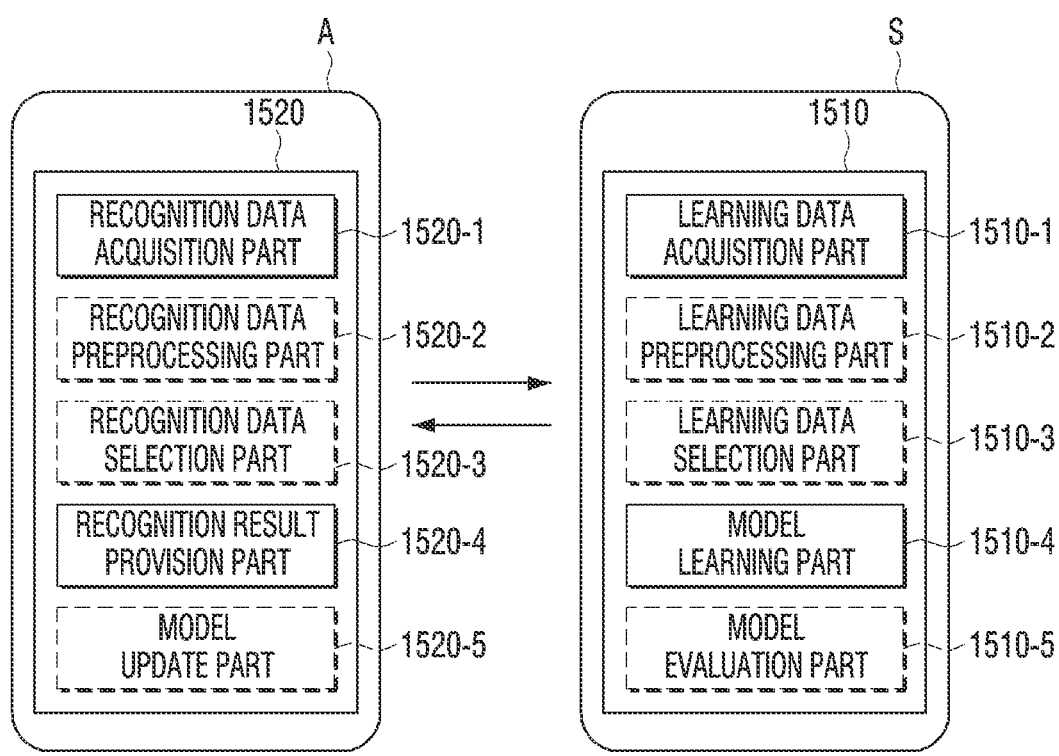

FIG. 15 to FIG. 17 are diagrams for illustrating operations of a learning part and a recognition part.

Referring to FIG. 15, the processor 1500 may include at least one of a learning part 1510 and a recognition part 1520. The processor 1500 in FIG. 15 may correspond to the processor 120 of the electronic device 100 or a processor of a data learning server (not shown).

The learning part 1510 may generate or train a recognition model having a standard for determination of specific circumstances. The learning part 1510 may generate a recognition model having a standard for determination by using collected learning data.

As an example, the learning part 1510 may generate, train, or update an object recognition model having a standard for determining what kind of object is included in an image and what kind of action the object is taking by using an image including an object as learning data.

As another example, the learning part 1510 may generate, train, or update an ambient information recognition model having a standard for determining various additional information around an object included in an image by using information on the surroundings included in a screen including an object as learning data.

As still another example, the learning part 1510 may generate, train, or update a face recognition model having a standard for determining the face of a user included in an image by using an input image as learning data.

The recognition part 1520 may assume a subject for recognition included in specific data and an action (a pose) of the subject for recognition by using the specific data as input data of a trained recognition model.

As an example, the recognition part 1520 may acquire (or, assume, infer) object information for an object included in an object area by using the object area (or, the image) including the object as input data of a trained recognition model.

As another example, the recognition part 1520 may assume (or, determine, infer) a search category to provide a search result by applying at least one of object information or context information to a trained recognition model. Here, a plurality of search results may be acquired according to the priorities.

As still another example, the recognition part 1520 may assume context recognition information related to an object (e.g., additional information related to an object, etc.) by applying context information (e.g., ambient information of an object) to a trained recognition model.

At least a part of the learning part 1510 and at least a part of the recognition part 1520 may be implemented as a software module or manufactured in the form of at least one hardware chip and mounted on the electronic device. For example, at least one of the learning part 1510 and the recognition part 1520 may be manufactured in the form of a dedicated hardware chip for artificial intelligence (AI), or manufactured as a part of a conventional generic-purpose processor (e.g.: a CPU or an application processor) or a graphic-dedicated processor (e.g.: a GPU), and mounted on the aforementioned various kinds of electronic devices or object recognition devices. Here, a dedicated hardware chip for artificial intelligence is a dedicated processor specialized in probability operations, and it has higher performance in parallel processing than conventional generic-purpose processors, and is capable of swiftly processing operation works in the field of artificial intelligence like machine learning. In case the learning part 1510 and the recognition part 1520 are implemented as a software module (or, a program module including instructions), the software module may be stored in a non-transitory computer readable medium. In this case, the software module may be provided by an operating system (OS), or a specific application. Alternatively, a portion of the software module may be provided by an operating system (OS), and the other portions may be provided by a specific application.

In this case, the learning part 1510 and the recognition part 1520 may be mounted on one electronic device, or respectively mounted on separate electronic devices. For example, one of the learning part 1510 and the recognition part 1520 may be included in the electronic device 100, and the other one may be included in an external server. Also, the learning part 1510 and the recognition part 1520 may be connected via wire or wirelessly, and model information constructed by the learning part 1510 may be provided to the recognition part 1520, and data input into the recognition part 1520 may be provided to the learning part 1510 as additional learning data.

FIG. 16 is a block diagram of the learning part 1510 and the recognition part 1520 according to various embodiments of the disclosure.

Referring to (a) in FIG. 16, the learning part 1510 according to some embodiments of the disclosure may include a learning data acquisition part 1510-1 and a model learning part 1510-4. Also, the learning part 1510 may selectively further include at least one of a learning data preprocessing part 1510-2, a learning data selection part 1510-3, or a model evaluation part 1510-5.

The learning data acquisition part 1510-1 may acquire learning data necessary for a recognition model for inferring a subject for recognition or an action (a pose) of a subject for recognition. According to an embodiment of the disclosure, the learning data acquisition part 1510-1 may acquire at least one of an entire image including an object, an image corresponding to an object area, object information, or context information as learning data. Learning data may be data collected or tested by the learning part 1510 or the manufacturer of the learning part 1510.

The model learning part 1510-4 may train a recognition model to have a standard for determination regarding how to determine a specific subject for recognition or an action (a pose) of a subject for recognition by using learning data. For example, the model learning part 1510-4 may train a recognition model through supervised learning of using at least some of learning data as a standard for determination. Alternatively, the model learning part 1510-4 may train a recognition model through unsupervised learning of finding a standard for determination for determining a situation by self-learning using learning data without any supervision, for example. Also, the model learning part 1510-4 may train a recognition model through reinforcement learning of using a feedback as to whether a determination result of a situation according to learning is correct, for example. In addition, the model learning part 1510-4 may train a recognition model by using a learning algorithm or the like including error back-propagation or gradient descent, for example.

Further, the model learning part 1510-4 may learn a standard for selection regarding which learning data should be used for assuming a subject for recognition by using input data.

In case there are a plurality of recognition models constructed in advance, the model learning part 1510-4 may determine a recognition model wherein there is high relevance between input learning data and basic learning data as a recognition model to be trained. In this case, basic learning data may be classified in advance for each type of data, and recognition models may be constructed in advance for each type of data. For example, basic learning data may be classified in advance according to various standards such as the areas wherein the learning data was generated, the time when the learning data was generated, the sizes of the learning data, the genres of the learning data, the generators of the learning data, the types of objects inside the learning data, etc.

When a recognition model is trained, the model learning part 1510-4 may store the trained recognition model. In this case, the model learning part 1510-4 may store the trained recognition model in the memory 1750 of the electronic device A. Alternatively, the model learning part 1510-4 may store the trained recognition model in a memory of a server connected with the electronic device A via wire or a wireless network.

The learning part 1510 may further include a learning data preprocessing part 1510-2 and a learning data selection part 1510-3 for improving an analysis result of a recognition model, or saving resources or time necessary for generating a recognition model.

The learning data preprocessing part 1510-2 may preprocess acquired data such that the acquired data can be used in learning for determination of a situation. Also, the learning data preprocessing part 1510-2 may process acquired data in a predetermined format such that the model learning part 1510-4 can use the acquired data for learning for determination of a situation.

The learning data selection part 1510-3 may select data necessary for learning among the data acquired at the learning data acquisition part 1510-1 or the data preprocessed at the learning data preprocessing part 1510-2. The selected learning data may be provided to the model learning part 1510-4. The learning data selection part 1510-3 may select learning data necessary for learning among the acquired or preprocessed data according to a predetermined standard for selection. Also, the learning data selection part 1510-3 may select learning data according to a predetermined standard for selection by learning by the model learning part 1510-4.

The learning part 1510 may further include a model evaluation part 1510-5 for improving an analysis result of a data recognition model.

The model evaluation part 1510-5 may input evaluation data into a recognition model, and in case the analysis result output from the evaluation data does not satisfy a predetermined standard, the model evaluation part 1510-5 may make the model learning part 1510-4 learn again. In this case, the evaluation data may be predefined data for evaluating a recognition model.

For example, in case the number or ratio of evaluation data of which analysis results are not correct exceeds a predetermined threshold value, among the analysis results of a trained recognition model for evaluation data, the model evaluation part 1510-5 may determine that a predetermined standard was not satisfied.

Meanwhile, in case there are a plurality of trained recognition models, the model evaluation part 1510-5 may determine whether each trained recognition model satisfies a predetermined standard, and determine a model satisfying a predetermined standard as a final recognition model. In this case, if there are a plurality of models satisfying a predetermined standard, the model evaluation part 1510-5 may determine any one model or models in a predetermined number that were set in advance in the order of having higher evaluation scores as a final recognition model.

Referring to (b) in FIG. 16, the recognition part 1520 according to some embodiments of the disclosure may include a recognition data acquisition part 1520-1 and a recognition result provision part 1520-4.

Also, the recognition part 1520 may selectively further include at least one of a recognition data preprocessing part 1520-2, a recognition data selection part 1520-3, or a model update part 1520-5.

The recognition data acquisition part 1520-1 may acquire data necessary for determination of a situation. The recognition result provision part 1520-4 may apply data acquired at the recognition data acquisition part 1520-1 to a trained recognition model as an input value and determine a situation. The recognition result provision part 1520-4 may provide an analysis result according to a purpose of analyzing data. The recognition result provision part 1520-4 may apply data selected by the recognition data preprocessing part 1520-2 or the recognition data selection part 1520-3 that will be described below to a recognition model as an input value, and acquire an analysis result. An analysis result may be determined by a recognition model.

As an example, the recognition result provision part 1520-4 may apply an object area including an object acquired at the recognition data acquisition part 1520-1 to a trained recognition model and acquire (or, assume) object information corresponding to the object area.

As another example, the recognition result provision part 1520-4 may apply at least one of an object area, object information, or context information acquired at the recognition data acquisition part 1520-1 to a trained recognition model and acquire (or, assume) a search category to provide a search result.

The recognition part 1520 may further include a recognition data preprocessing part 1520-2 and a recognition data selection part 1520-3 for improving an analysis result of a recognition model, or saving resources or time for providing an analysis result.

The recognition data preprocessing part 1520-2 may preprocess acquired data such that the acquired data can be used for determination of a situation. Also, the recognition data preprocessing part 1520-2 may process acquired data in a predetermined format such that the recognition result provision part 1520-4 can use the acquired data for determination of a situation.

The recognition data selection part 1520-3 may select data necessary for determination of a situation among the data acquired at the recognition data acquisition part 1520-1 or the data preprocessed at the recognition data preprocessing part 1520-2. The selected learning data may be provided to the recognition result provision part 1520-4. The recognition data selection part 1520-3 may select some or all of the acquired or preprocessed data according to a predetermined standard for selection for determination of a situation. Also, the recognition data selection part 1520-3 may select data according to a predetermined standard for selection by learning by the model learning part 1510-4.

The model update part 1520-5 may control a recognition model to be updated based on an evaluation for an analysis result provided by the recognition result provision part 1520-4. For example, the model update part 1520-5 may provide an analysis result provided by the recognition result provision part 1520-4 to the model learning part 1510-4, and thereby request the model learning part 1510-4 to additionally train or update a recognition model.

FIG. 17 is a diagram illustrating an embodiment wherein an electronic device A and a server S according to an embodiment of the disclosure learn and recognize data by interlocking with each other.

Referring to FIG. 17, the server S may learn a standard for determination of a situation, and the electronic device A may determine a situation based on a learning result by the server S.

In this case, the model learning part 1510-4 of the server S may perform the function of the learning part 1510 illustrated in FIG. 15. The model learning part 1510-4 of the server S may learn a standard regarding which object image, object information, or context information are to be used to determine a specific situation, and how to determine the situation by using the data.

Also, the recognition result provision part 1520-4 of the electronic device A may apply data selected by the recognition data selection part 1520-3 to a recognition model generated by the server S, and determine object information or a search category. Alternatively, the recognition result provision part 1520-4 of the electronic device A may receive a recognition model generated by the server S from the server S, and determine a situation by using the received recognition model. In this case, the recognition result provision part 1520-4 of the electronic device A may apply an object image selected by the recognition data selection part 1520-3 to the recognition model received from the server S, and determine object information corresponding to the object image. Alternatively, the recognition result provision part 1520-4 may determine a search category to acquire a search result by using at least one of context information or context recognition information.

Figure 18:
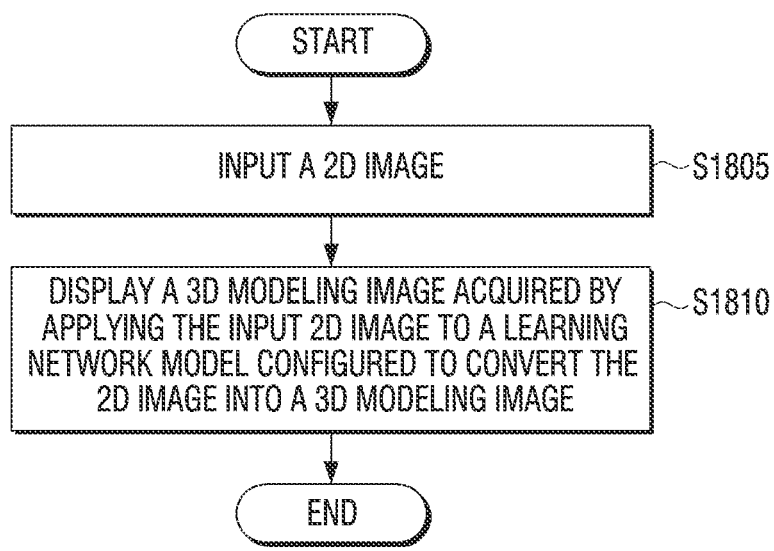
FIG. 18 is a flow chart for illustrating a control method of an electronic device according to an embodiment of the disclosure.

FIG. 18 is a flow chart for illustrating a control method of an electronic device according to an embodiment of the disclosure.

In a control method of an electronic device 100 according to an embodiment of the disclosure, a 2D image may be input in operation S1805. Also, in the control method, a 3D modeling image acquired by applying the input 2D image to a learning network model configured to convert the 2D image into a 3D modeling image may be displayed in operation S1810. Here, the learning network model may be a learning network model trained by using a 3D pose acquired by rendering virtual 3D modeling data and a 2D image corresponding to the 3D pose.

Here, the learning network model may be a learning network model that may transform a 3D human model into a plurality of 3D poses based on data and acquire at least one 2D image corresponding to each of the plurality of 3D poses, and that is trained by using the plurality of 3D poses and the at least one 2D image corresponding to each of the plurality of 3D poses.

Also, the learning network model may identify profile information of an object included in the input 2D image, and acquire the 3D human model corresponding to the profile information.

In addition, the learning network model may transform the pose of the 3D human model such that a plurality of body parts, divided based on joints included in the 3D human, model move within a predetermined angle range based on the 3D modeling data, and acquire at least one 2D image corresponding to the transformed pose.

Further, the learning network model may transform a 3D human model into the 3D pose based on the 3D modeling data, and acquire a plurality of 2D images corresponding to different directions with respect to the 3D pose.

Also, the 3D modeling data may include at least one of angle data among a plurality of body parts divided based on joins included in a 3D human model, length data of each body part, or direction data of each body part.

In addition, the learning network model may learn weights of a neural network included in the learning network model by using a plurality of 3D poses and at least one 2D image corresponding to each of the plurality of 3D poses.

Also, in the control method of the electronic device 100, based on a user instruction for changing a user viewpoint being input, information corresponding to the user instruction may be input into the learning network model, and the learning network model may output the 3D modeling image based on the information corresponding to the user instruction.

Here, the user viewpoint may include at least one of a direction which a user is toward or a distance which the user is toward.

Also, the control method of the electronic device 100 may provide a UI for receiving input of pose information for transforming a 3D human model.

Meanwhile, the control method of an electronic device as in FIG. 18 may be executed in an electronic device having the configuration as in FIG. 3 or FIG. 4, or executed in electronic devices having other configurations.

Meanwhile, methods according to the aforementioned various embodiments of the disclosure may be implemented in forms of applications that can be installed on conventional electronic devices.

Also, methods according to the aforementioned various embodiments of the disclosure may be implemented just by software upgrade, or hardware upgrade of conventional electronic devices.

Further, the aforementioned various embodiments of the disclosure may be implemented through an embedded server provided to an electronic device, or through an external server of an electronic device.

Meanwhile, a control method of an electronic device according to the aforementioned embodiments may be implemented as a program and provided to an electronic device. In particular, a program including a control method of an electronic device may be provided while being stored in a non-transitory computer readable medium.

Also, the various embodiments described above may be implemented in a recording medium that can be read by a computer or a device similar to a computer, by using software, hardware, or a combination thereof. According to implementation by hardware, the embodiments described in the disclosure may be implemented by using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In some cases, the embodiments described in this specification may be implemented as the processor 120 itself. Also, according to implementation by software, the embodiments such as procedures and functions described in this specification may be implemented as separate software modules. Each of the software modules may perform one or more functions and operations described in this specification.

Meanwhile, computer instructions for performing processing operations at the electronic device according to the aforementioned various embodiments of the disclosure may be stored in a non-transitory computer readable medium. Computer instructions stored in such a non-transitory computer readable medium make the processing operations at the electronic device according to the aforementioned various embodiments performed by a specific machine, when the instructions are executed by the processor of the specific machine.

A non-transitory computer readable medium refers to a medium that stores data semi-permanently, and is readable by machines, but not a medium that stores data for a short moment such as a register, a cache, and a memory. As specific examples of a non-transitory computer readable medium, there may be a CD, a DVD, a hard disc, a blue-ray disc, a USB, a memory card, a ROM and the like.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:
1. An electronic device comprising:
a display;
a processor electronically connected to the display so as to control the display; and
a memory electronically connected to the processor,
wherein the memory stores instructions causing the processor to control the display to display a three-dimensional (3D) modeling image acquired by applying an input two-dimensional (2D) image to a learning network model configured to convert the input 2D image into the 3D modeling image,
wherein the learning network model is trained by using a first 3D pose of a 3D human model acquired by rendering virtual 3D modeling data and a plurality of 2D images corresponding to the first 3D pose,
wherein the 3D human model is generated in a virtual three-dimensional space, wherein the plurality of 2D images corresponds to different virtual directions of viewing the first 3D pose of the 3D human model in the virtual three-dimensional space,
wherein the learning network model transforms the 3D human model into a plurality of 3D poses based on the virtual 3D modeling data and acquires a plurality of 2D images corresponding to each of the plurality of 3D poses, and that is trained by using the plurality of 3D poses and the plurality of 2D images corresponding to each of the plurality of 3D poses,
wherein the learning network model is configured to:
identify profile information of an object included in the input 2D image, and
acquire the 3D human model corresponding to the profile information,
wherein the learning network model is configured to transform the 3D human model into the first 3D pose based on the virtual 3D modeling data,
wherein the virtual 3D modeling data includes at least one of angle data among a plurality of body parts divided based on joints included in the 3D human model, length data of each body part, or direction data of each body part,
wherein the learning network model is configured to learn weights of a neural network included in the learning network model by using the plurality of 3D poses and the plurality of 2D images corresponding to each of the plurality of 3D poses, and
wherein the processor is configured to:
provide a user interface (UI) for receiving input of pose information for transforming the 3D human model.

2. The electronic device of claim 1, wherein the learning network model is configured to:
transform the first 3D pose for the 3D human model such that the plurality of body parts, divided based on the joints included in the 3D human model, move within a predetermined angle range based on the virtual 3D modeling data, and
acquire the plurality of 2D images corresponding to the transformed pose.

3. The electronic device of claim 1,
wherein the processor is configured to, based on a user instruction for changing a user viewpoint being input, input information corresponding to the user instruction into the learning network model, and
wherein the learning network model is configured to output the 3D modeling image based on the information corresponding to the user instruction.

4. The electronic device of claim 3, wherein the user viewpoint includes at least one of a direction which a user is toward or a distance which the user is toward.

5. A method of operating an electronic device, the method comprising:
receiving an input two-dimensional (2D) image; and
displaying a three-dimensional (3D) modeling image acquired by applying the input 2D image to a learning network model configured to convert the input 2D image into the 3D modeling image,
wherein the learning network model is trained by using a first 3D pose of a 3D human model acquired by rendering virtual 3D modeling data and a plurality of 2D images corresponding to the first 3D pose,
wherein the 3D human model is generated in a virtual three-dimensional space,
wherein the plurality of 2D images corresponds to different virtual directions of viewing the first 3D pose of the 3D human model in the virtual three-dimensional space, wherein the learning network model transforms the 3D human model into a plurality of 3D poses based on the virtual 3D modeling data and acquires a plurality of 2D images corresponding to each of the plurality of 3D poses, and that is trained by using the plurality of 3D poses and the plurality of 2D images corresponding to each of the plurality of 3D poses, wherein the learning network model is configured to:
identify profile information of an object included in the input 2D image, and
acquire the 3D human model corresponding to the profile information, wherein the learning network model is configured to transform the 3D human model into the first 3D pose based on the virtual 3D modeling data, wherein the virtual 3D modeling data includes at least one of angle data among a plurality of body parts divided based on joints included in the 3D human model, length data of each body part, or direction data of each body part, wherein the learning network model is configured to learn weights of a neural network included in the learning network model by using the plurality of 3D poses and the plurality of 2D images corresponding to each of the plurality of 3D poses, and wherein the method further comprising:
providing a user interface (UI) for receiving input of pose information for transforming the 3D human model.

6. The method of claim 5, wherein the learning network model is configured to:
transform the first 3D pose for the 3D human model such that the plurality of body parts, divided based on the joints included in the 3D human model, move within a predetermined angle range based on the virtual 3D modeling data, and
acquire the plurality of 2D images corresponding to the transformed pose.

* * * * *